United States Patent [19]

Yamamuro et al.

[11] Patent Number: 4,589,071
[45] Date of Patent: May 13, 1986

[54] METHOD AND APPARATUS FOR CONTROLLING REDUCTION RATIO OF CONTINUOUSLY VARIABLE TRANSMISSION WITH ACCELERATION COMPENSATION

[75] Inventors: Sigeaki Yamamuro, Zushi; Keiju Abo, Yokosuka; Yoshikazu Tanaka; Haruyoshi Kumura, both of Yokohama; Hiroyuki Hirano; Yoshiro Morimoto, both of Yokosuka, all of Japan

[73] Assignee: Nissan Motor Co., Ltd., Yokohama, Japan

[21] Appl. No.: 486,501

[22] Filed: Apr. 19, 1983

[30] Foreign Application Priority Data

Apr. 19, 1982 [JP] Japan .................................. 57-63866
Apr. 30, 1982 [JP] Japan .................................. 57-71510

[51] Int. Cl.⁴ .................... B60K 41/18; F16H 9/18; F16H 11/06; G05D 17/02
[52] U.S. Cl. .................................. 364/424.1; 74/866; 474/18
[58] Field of Search .............. 364/424.1; 79/857, 866, 79/867; 474/12, 18, 28

[56] References Cited

U.S. PATENT DOCUMENTS

| 4,157,124 | 6/1979 | Poore | 74/866 |
| 4,246,807 | 1/1981 | Kofink | 474/18 |
| 4,262,335 | 4/1981 | Ahlen et al. | 74/866 |
| 4,312,249 | 1/1982 | Hau et al. | 74/866 |
| 4,350,234 | 9/1982 | Suga et al. | 74/866 |
| 4,361,060 | 11/1982 | Smyth | 74/866 |
| 4,387,608 | 6/1983 | Mohl et al. | 74/866 |
| 4,411,174 | 10/1983 | Yokoi et al. | 74/866 |
| 4,419,910 | 12/1983 | Miki et al. | 74/867 |
| 4,458,318 | 7/1984 | Smit et al. | 364/424.1 |
| 4,462,275 | 7/1984 | Mohl et al. | 74/866 |
| 4,466,521 | 8/1984 | Hattori et al. | 74/866 |

FOREIGN PATENT DOCUMENTS

| 2947658 | 7/1981 | Fed. Rep. of Germany . |
| 56-46153 | 4/1981 | Japan . |
| 57-33255 | 2/1982 | Japan . |
| 1525861 | 9/1978 | United Kingdom . |
| 2030661 | 6/1979 | United Kingdom . |
| 2042658 | 8/1979 | United Kingdom . |
| 2058256 | 4/1981 | United Kingdom . |

Primary Examiner—Felix D. Gruber
Attorney, Agent, or Firm—Schwartz, Jeffery, Schwaab, Mack, Blumenthal & Evans

[57] ABSTRACT

A method and an apparatus for controlling the reduction ratio of a continuously variable transmission are disclosed wherein normally the reduction ratio is controlled in response to a desired optimum reduction ratio indicative signal obtained by retrieving the data stored in a memory versus engine load and vehicle speed, but when more vehicle acceleration is needed, the reduction ratio is controlled by a corrected desired optimum reduction ratio indicative signal to increase the reduction ratio.

22 Claims, 34 Drawing Figures

|       | A | B | C | D |
|-------|---|---|---|---|
| 317 a | H | L | L | H |
| 317 c | H | H | L | L |
| 317 b | L | H | H | L |
| 317 d | L | L | H | H |

⟶ UPSHIFT
⟵ DOWNSHIFT

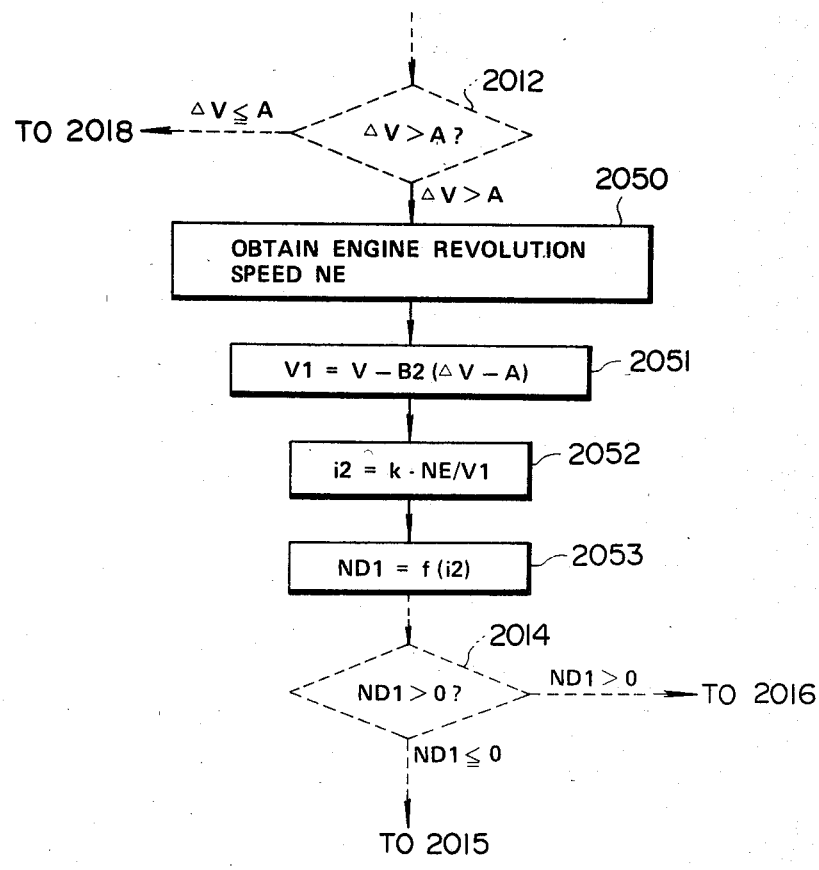

METHOD AND APPARATUS FOR CONTROLLING REDUCTION RATIO OF CONTINUOUSLY VARIABLE TRANSMISSION WITH ACCELERATION COMPENSATION

BACKGROUND OF THE INVENTION

1. Field of the Invention

The present invention relates to a method and an apparatus for controlling a reduction ratio of a continuously variable transmission of an automotive vehicle.

2. Description of the Prior Art

In a known continuously variable transmission disclosed in Japanese patent application provisional publication No. 56-46153 which appears to correspond to British patent application provisional publication GB 2,058,256A and U.S. Pat. No. 4,387,608, the revolution speed of a drive pulley and the engine throttle opening degree (or the engine manifold vacuum) are detected to determine an actual engine operating condition, then the actual engine operating condition is compared with a predetermined ideal engine operating condition determined in accordance with a predetermined shift pattern to provide a deviation therebetween, and then the reduction ratio is controlled to decrease the deviation therebetween.

SUMMARY OF THE INVENTION

An object of the present invention is to provide a method and an apparatus for controlling a reduction ratio of a continuously variable transmission in response to an acceleration of the vehicle.

A particular object of the present invention is to provide a method and an apparatus for controlling a reduction ratio of a continuously variable transmission wherein a reduction ratio is increased when the vehicle acceleration is less than a reference acceleration value to let the engine produce a sufficiently high power output.

Another particular object of the present invention is to provide a method and an apparatus for controlling a reduction ratio of a continuously variable transmission wherein a reduction ratio is increased to ensure effective engine braking.

According to the present invention, there is provided a method for controlling a reduction ratio of a continuously variable transmission of an automotive vehicle having an internal combustion engine, which method comprises:

(a) generating an acceleration indicative signal representing a vehicle acceleration of the automotive vehicle;

(b) detecting at least one operating condition of the automotive vehicle;

(c) generating a desired optimum reduction ratio indicative signal representing a desired optimum reduction ratio for the detected operating condition of the automotive vehicle in response to at least the acceleration indicative signal;

(d) adjusting the actual reduction ratio of the continuously variable transmission toward a value which agrees with the desired optimum reduction ratio represented by the desired optimum reduction ratio indicative signal; and (e) repeating the steps (a), (b), (c) and (d) until the actual reduction ratio agrees with said desired optimum reduction ratio represented by the second desired optimum reduction ratio indicative signal.

According to the present invention, there is provided an apparatus for controling a reduction ratio of a continuously variable transmission of an automotive vehicle having an internal combustion engine, which apparatus comprises:

means for generating an acceleration indicative signal representing a vehicle acceleration of the automotive vehicle;

means for detecting at least one operating condition of the automotive vehicle;

means for generating a desired optimum reduction ratio indicative signal representing a desired optimum reduction ratio for the detected operating condition of the automotive vehicle in response to at least the acceleration indicative signal; and means for adjusting the actual reduction ratio of the continuously variable transmission toward a value which agrees with the desired optimum reduction ratio represented by the second optimum reduction ratio indicative signal.

BRIEF DESCRIPTION OF THE DRAWINGS

The present invention is more specifically described in connection with the accompanying drawings, wherein:

FIG. 32 is a portion of a flow chart of a stepper motor control routine of an eighth embodiment according to the present invention.

DETAILED DESCRIPTION OF THE INVENTION

Referring to the accompanying drawings, the present invention is described hereinafter in connection with preferred embodiments.

Figure 1:
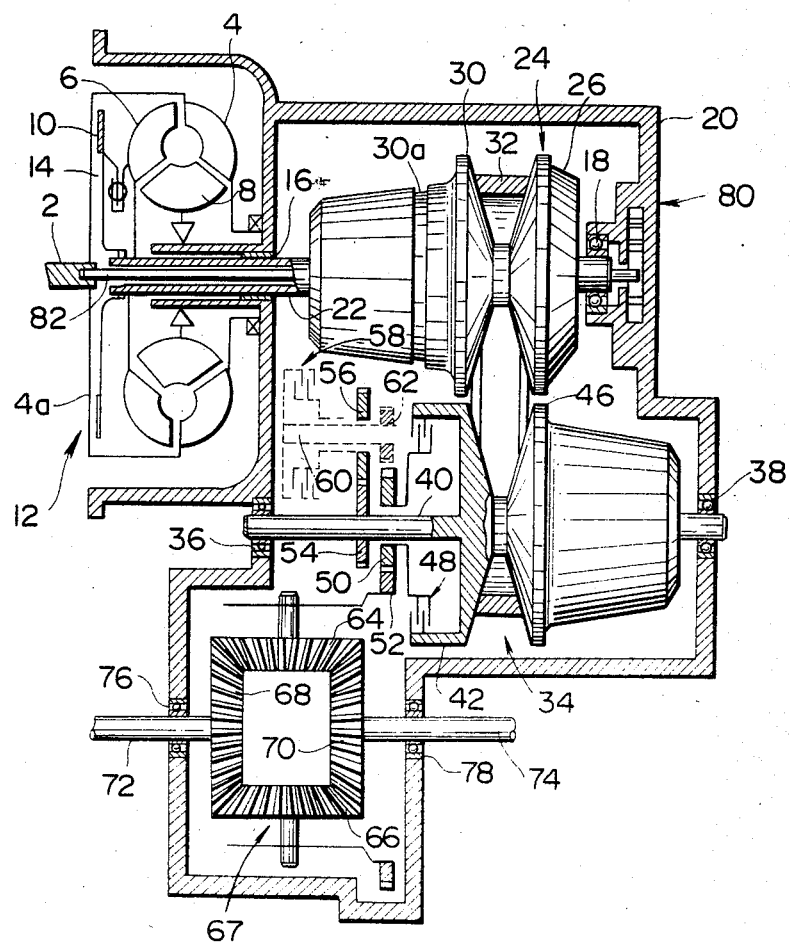
FIG. 1 is a diagrammatic cross sectional view illustrating a power transmission mechanism of a continuously variable V-belt transmission.
Figure 2:
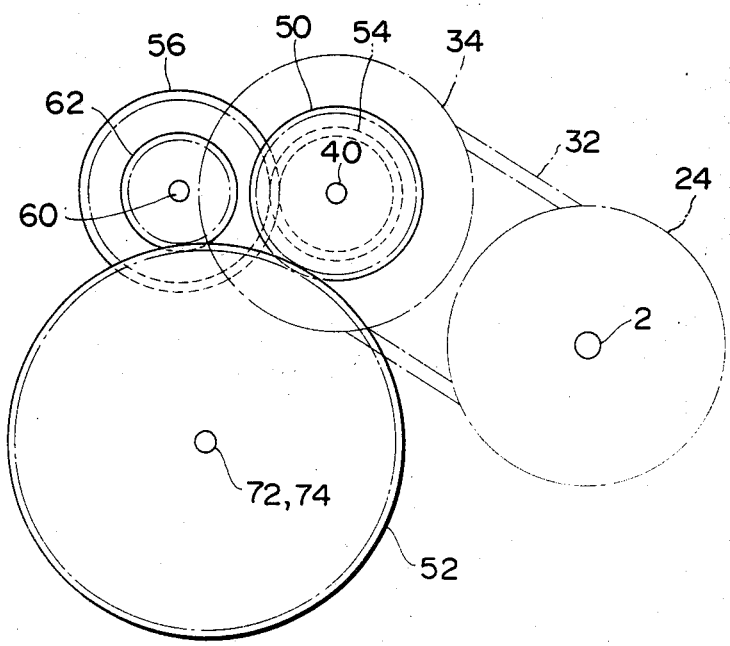
FIG. 2 is a layout of the shafts of the transmission mechanism shown in FIG. 1.

Referring to FIG. 1, a torque converter 12 (which may be replaced with a fluid coupling) includes a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14. The lock-up clutch 10 operates such that when the oil pressure within the lock-up clutch oil chamber 14 becomes lower than that within the interior of the torque converter 12, the lock-up clutch 10 is pressed against the member 4a by the pressure difference to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 secured to the drive shaft 22 and an axially movable conical disc 30 which is so disposed as to face the axially fixed conical disc 26 to define a V-shaped pulley groove therebetween and which is controllably movable in an axial direction of the driven shaft 22 in response to an oil pressure created within a drive pulley cylinder chamber 28 (see FIG. 3). For limiting the maximum width of the V-shaped pulley groove, an annular member 22a is fixed to the drive shaft 22 and so dispoed as to engage the axially movable conical disc 30 of the drive pulley 24 (see FIG. 3). The drive pulley 24 is drivingly connected to a driven pulley 34 via a V-belt 32. The V-belt 32 runs over the drive pulley 24 and the driven pulley 34. The driven pulley 34 is arranged on a driven shaft 40 which is rotatably supported by the case 20 via the bearings 36 and 38. The driven pulley 34 comprises an axially fixed conical disc 42 secured to the driven shaft 40 and an axially movable conical disc 46 which is so disposed as to face the fixed conical disc 42 in such a manner as to define a V-shaped pulley groove and which is controllably movable in an axial direction of the driven shaft 40 in response to an oil pressure created in a driven pulley cylinder chamber 44 (see FIG. 3). Similarly to the drive pulley 24, an annular member 40a is fixed to the driven shaft 40 to limit the movement of the axially slidable conical disc 46 of the driven pulley 24 so as to define the maximum width of the V-shaped pulley groove. The axially fixed conical disc 42 is drivingly connectable via a forward drive multiple disc clutch 48 to a forward drive gear 50 rotatably supported on the driven shaft 40, this forward drive gear being in mesh with a ring gear 52. Fixedly mounted to the driven shaft 40 is a reverse drive gear 54 which is in mesh with an idler gear 56. The idler gear 56 is drivingly connectable via a reverse drive multiple disc clutch 58 to an idler shaft 60 which has fixed thereto another idler gear 62 that is in mesh with the ring gear 52. In FIG. 1, the idler gear 62, idler shaft 60 and reverse drive multiple disc clutch 54 are illustrated in positions displaced from the actual positions thereof for ease of illustration, the idler gear 62 and ring gear 52 are shown as out of mesh with each other. But, they are actually in mesh with each other as shown in FIG. 2. The ring gear 52 has attached thereto a pair of pinion gears 64 and 66. A pair of axle or output shafts 72 and 74 are coupled with side gears 68 and 70, respectively, which are in mesh with the pinion gears 64 and 66 to cooperate with each other to form a differential 67. The axle shafts 72 and 74 are supported via bearings 76 and 78, respectively, extend outwardly of the case 20 in the opposite directions and are connected to road wheels (not shown), respectively. As viewed in FIG. 1, there is arranged on the righthand side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22.

Rotary power fed from the engine output shaft 2 is transmitted via the torque converter 12, drive shaft 22, drive pulley 24, V-belt 32, and driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the axle shafts 72 and 74 to rotate them in the forward rotational direction, whereas, in the case the reverse drive multiple disc clutch 58 is engaged with the forward drive multiple disc clutch 48 released, the rotation of the shaft 40 is transmitted via the reverse drive gear 54, idler gear 56, idler shaft 60, idler gear 62, ring gear 52 and differential 67 to the axle shafts 72 and 74 to rotate them in the reverse rotational direction. During this transmission of power, the ratio between the rotation of the drive pulley 24 and that of the driven pulley 34 may be varied by moving the axially movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 will result in a reduction in radius of the diameter of the drive pulley 24 contacting with the V-belt 32 and an increase in radius of the diameter of the driven pulley 34 contacting with the V-belt 32, resulting in an increase in reduction ratio. As a result, a reduction ratio increases. If the axially movable conical discs 30 and 46 are moved in the respective reverse directions, a reduction ratio decreases. Depending upon the conditions, the torque converter serves as a torue mulitplier or serves as a fluid coupling but, since it has the lock-up clutch 10 as attached to the turbine runner 6, the torque converter 12 can establish a direct mechanical connection between the engine output shaft 2 and driven shaft 22 when the lock-up clutch oil chamber 14 is drained, thus pressing the lock-up clutch 10 against the member 4a integral with the pump impeller 4.

Figure 3:
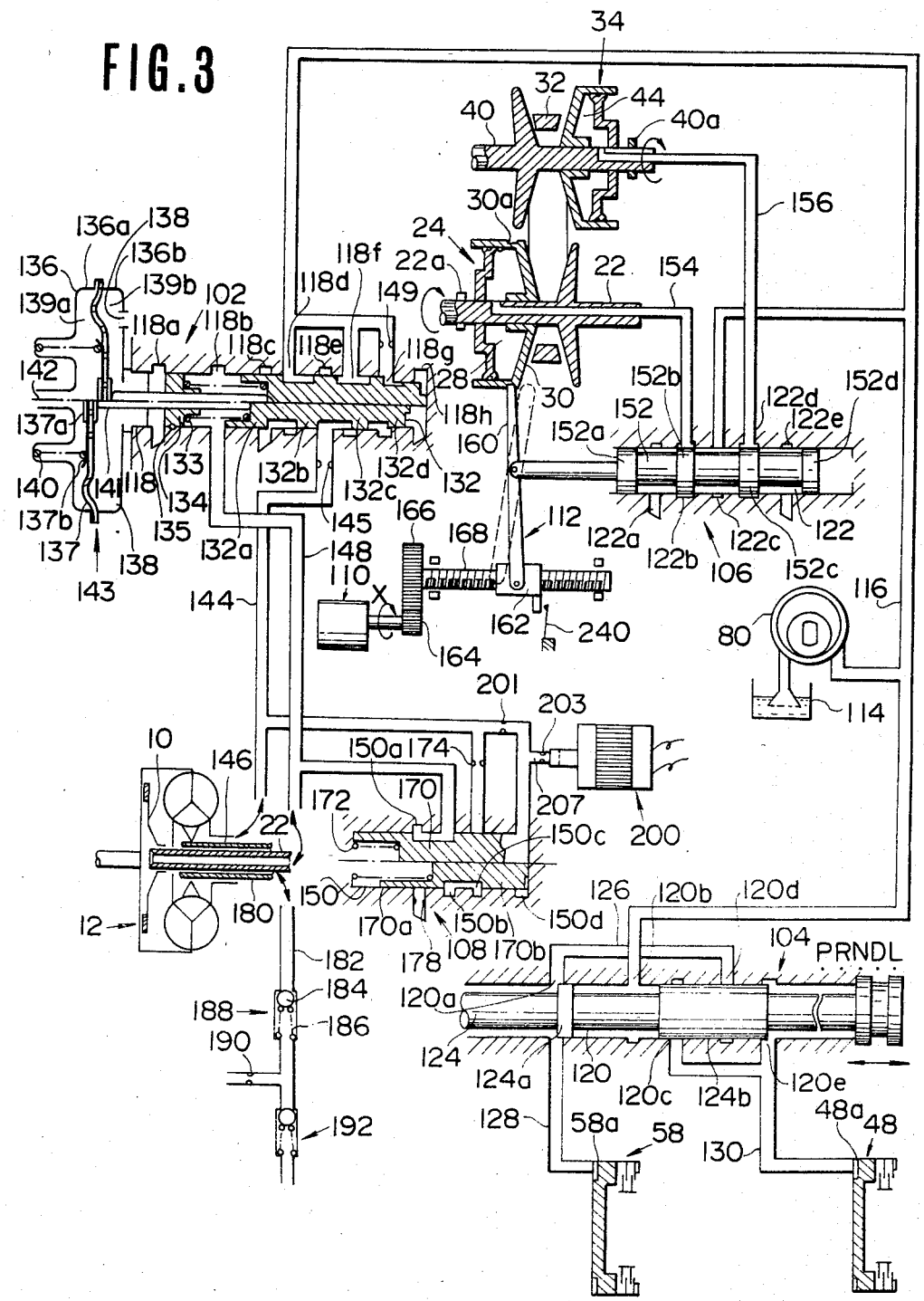
FIG. 3 is a view showing a hydraulic control system for the continuously variable V-belt transmission shown in FIGS. 1 and 2.

Referring to FIG. 3, a hydraulic control system for the continuously variable transmission is explained. As shown in FIG. 3, the control system comprises an oil pump 80, a line pressure regulator valve 102,, a manual valve 104, a shift control valve 106, a lock-up valve 108 a shift motor 110, and a shift operating mechanism 112.

The oil pump 80 which is driven by the engine output shaft 2 draws off the oil from the tank 114 and discharges the oil under pressure into the oil conduit 116. The oil conduit 116 leads to ports 118e, 118f and 118g of the line pressure regulator valve 102 where the oil is regulated to generate a pressure oil under line pressure. This pressure oil is hereinafter referred to as a line pressure. The oil conduit 116 communicates with a port 120b of the manual valve 104 and a port 122c of the shift control valve 106.

The manual valve 104 has a valve bore 120 with five ports 120a, 120b, 120c, 102d and 120e, and a spool 124 having thereon two lands 124a and 124b slidably disposed in the valve bore 120. The spool 124 is actuated by a shift lever (not shown) between five detent positions or shift positions for P range, R range, N range, D range and L range. The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive the line pressure therein. When the spool 124 is set in P range, the port 120b supplied with the line pressure is covered by a land 124b, so that the cylinder chamber 58a of the reverse drive multiple disc clutch 58 and the cylinder chamber 48a of the forward drive multiple disc clutch 48 are drained via the oil conduit 126 and ports 120d and 120e. When the spool 124 is set in R range, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in N range, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is set in P range. When the spool 124 is set in D range or L range, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in P range or N range, both the forward drive multiple disc clutch 48 and the reverse drive multiple disc clutch 58 are released to interrupt the transmission of power, thus preventing the rotation of output shatfs 72 and 74. When the spool 124 is set in R range, the reverse drive multiple disc clutch 58 is engaged so as to drive the axle shafts 72 and 74 in the reverse rotational direction. When the spool 124 is set in D range or L range, the forward drive multiple disc clutch 48 is engaged so as to drive the axle shafts 72 and 74 in the forward rotational direction. Although there occurs no difference in the respect of a hydraulic circuit between the case where D range is selected and the case where L range is selected as mentioned above, both of the ranges are electrically detected to actuate the shift motor 110 in such a manner as to effect a shift control in accordance with different shift patterns.

The line pressure regulator valve 102 comprises a valve bore 118 with eight ports 118a, 118b, 118c, 118d, 118e, 118f, 118g and 118h; a spool 132 having thereon four lands 132a, 132b, 132c, and 132d, and a spring 133c disposed on the left hand side of the spool 132; and a spring seat 134 fixed relative to the valve bore 118 by a pin 135. It is to be noted that the land 132d on the right-hand end of the spool 132 is smaller in diameter than the middle lands 132a, 132b and 132c. A vacuum diaphragm 143 is arranged on the inlet of the bore 118. The vacuum diaphragm 143 is constructed of two parts 136a and 136b which clamp therebetween a diaphragm 137 and cooperate with each other to form a casing 136. The casing 136 is divided by the diaphragm 137 into two chambers 139a and 139b. Attached by a fixer 137a to the diaphragm 137 is a spring seat 137b with which a spring 140 is disposed in the chamber 139a biasing the diaphragm 137 to the right. The intake manifold vacuum is introduced into the chamber 139a via a port 142, while the other chamber 139b is vented to the atmosphere via a port 138. Arranged between the diaphragm 137 of the vacuum diaphragm 143 and the spool 132 is a rod 141 extending through the spring seat 134 so as to apply a rightwardly directed bias force to the spool 132. The arrangement is such that this bias force increases as the intake manifold vacuum decreases or becomes small. That is, if the intake manifold vacuum is small (i.e., if the intake manifold vacuum is near the atmospheric pressure), a large rightwardly directed force by the spring 140 is applied to the spool 132 through the rod 141 since a difference in pressure between the chambers 139a and 139b is small and thus the leftwardly directed force caused by this pressure difference and applied to the diaphragm 137 is small. In the reverse case where the intake manifold vacuum is large, the force applied to the spool 132 becomes small since the leftwardly directed force caused by the pressure difference between the chambers 139a and 139b becomes large and thus the rightwardly directed force by the spring 140 decreases correspondingly. The ports 118d, 118f and 118g of the line pressure regulator valve 102 are supplied with the oil under pressure from the oil pump 80, and the inlet to the port 118g is provided with an orifice 149. The ports 118a, 118c and 118h are at all times drained, and the port 118e is connected by an oil conduit 144 with the torque converter inlet port 146 and also with the ports 150c and 150d of the lock-up valve 108, and the port 118b is connected by an oil conduit 148 with the port 150b of the lock-up valve 108 and also with the lock-up clutch oil chamber 14. For preventing the application of an excessive pressure to the interior of the torque converter 12, the oil conduit 144 is provided with an orifice 145. Consequently, three forces act on the spool 132 in the rightward direction, i.e. one by the spring 133, another by the vacuum diaphragm 143 via the rod 141 and the other by the oil pressure applied to the leftend of the land 132a via the port 118b. One force acts on the spool 132 in the leftward direction by the line pressure at the port 118g acting on differential area between the lands 132c and 132d. The spool 132 effects pressure regulation to provide the line pressure at the port 118d by adjusting the amount of drainage oil passing from the ports 118f and 118d to the respective ports 118e and 118c (i.e., first of all the oil is drained from the port 118f to the port 118e and, if more drainage is demanded, the oil is drained from the port 118d to the port 118c) until the rightwardly directed forces balance with the leftwardly directed force. As a result, the line pressure increases as the engine intake manifold vacuum drops and it increases as the oil pressure building up in the port 118b (i.e., the same pressure as in the lock-up clutch oil chamber 14) increases. Because the oil pressure exists in the oil chamber 14, the torque converter 12 is in a non lock-up state and serves as a torque multiplier. The variation in the line pressure in this manner meets the actual demands, i.e., the line pressure must be increased to increase a bracing force with which each of the pulleys 24 and 34 are biased against the V-belt 32 in response to an increase in the torque to be transmitted via the pulleys which increases as the engine load increases, i.e., as the intake manifold vacuum decreases, and besides the line pressure must be increased to increase the torque to be transmitted via the pulley as the multiplication of torque by the torque converter 12 increases.

The shift control valve 106 has a valve bore 122 with five ports 122a, 122b, 122c, 122d and 122e, and a spool 152 slidably disposed in the valve bore 122 and having thereon four lands 152a, 152b, 152c and 152d. The center port 122c communicates with the oil conduit 116 and is supplied with the line pressure, the left port 122b and the right port 122d communicate via respective conduits 154 and 156 with the drive pulley cylinder chamber 28 of the drive pulley 24 and the driven pulley cylinder chamber 44 of the driven pulley 34. Both of the end ports 122a and 122e are drained. The left end of the spool 152 is linked to a substantially middle portion of a lever 160 of the later-mentioned shift operating mechanism 112. The width of each of the lands 152b and 152c is set slightly shorter than the width of the respective ports 122b and 122d, and the distance between the lands 152b and 152c is set substantially the same as that between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. If the spool 152 is urged to move rightwardly, the reverse action to that mentioned above proceeds to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotatioal direction to cause the sleeve 162 to move leftwardly, the lever 160 moves in a clockwise rotational direction with its end portion received by the annular groove 30a of the axially movable conical disc 30 of the drive pulley 24 as a fulcrum point, causing leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a decrease in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a large reduction ratio. This action causes the spool 153 and the drive pulley 24 and driven pulley 34 to assume a state accomplishing a reduction ratio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the reduction ratio in the continuously variable transmission by controlling the shift motor 110, alone.

The shift motor 110 is controlled by a control unit 300 which is described later in more detail in connection with FIG. 4.

The lock-up valve 108 comprises a valve bore 150 formed with four ports 150a, 150b, 150c and 150d, a spool 170 having two lands 170a and 170b, a spring 172 biasing the spool 170 rightwardly, and a lock-up solenoid 200 provided in the oil conduit communicating with the port 150d. The port 150a is drained. The port 150b communicates via an oil conduit 148 with the port 118b of the line pressure regulator valve 102 and also with the lock-up clutch oil chamber 14 within the torque converter 12. The ports 150c and 150d are connected with each other via an orifice 201. A branch oil conduit 207 is formed between the port 150d and the orifice 201. The branch oil conduit 207 opens via an orifice 203 and has its outlet closed or opened by the lock-up solenoid 200 in response to on state thereof or off state thereof. The size of the orifice 203 is greater than that of the orifice 201. When the lock-up solenoid 200 is in the on state, the spool 170 is pressed against the force of the spring 172 toward the left because the same oil pressure as that supplied to the torque converter inlet port 146 is supplied to the port 150d from the oil conduit 144 as a result of closing of the outlet of the branch oil conduit 207. In this state, the port 150c is blocked by the land 170b and the port 150b is allowed to drain toward the port 150a. As a result, the lock-up clutch oil chamber 14 which has been connected with the oil pressure via the port 150b and the oil conduit 148 is drained, allowing the lock-up clutch 10 to be engaged under the influence of the pressure in the torque converter 12, thus putting the torque converter 12 into the lock-up state where the torque converter does not serve as a torque converter. In the reverse case when the lock-up solenoid 200 is put into the off state, the spool 170 is moved in the rightward direction by the rightwardly directed force by the spring 172 and the port 150b is allowed to communicate with the port 150c since the oil pressure at the port 150d drops due to uncovering of the outlet of the branch oil conduit 207 (the portion of the oil conduit 144 which is subjected to this drop in pressure is confined to a portion between the orifice 201 and the port 150d, leaving the remainder of the oil conduit 144 insensitive to this pressure drop owing to the provision of the orifice 201) thus causing the force biasing the spool 170 to the left to disappear. As a result, the oil conduit 148 is allowed to communicate with the oil conduit 144, applying the same oil pressure as that applied to the torque converter inlet port 146 to the lock-up clutch oil chamber 14, causing the pressures on the both sides of the lock-up clutch 10 to become equal to each other, resulting in the release of the lock-up clutch 10. An orifice 174 is provided in the inlet of the port 150c and another orifice 178 is provided in the drain oil conduit connected with the port 150a. The orifice 178 is provided to prevent rapid drainage of the oil pressure from the lock-up clutch oil chamber 14 so as to alleviate a shock upon shifting into the lock-up state, whereas, the orifice 174 is provided in the oil conduit 144 to permit a gradual increase in oil pressure within the lock-up oil chamber 14 so as to alleviate a shock upon release from the lock-up state.

The torque converter outlet port 180 communicates with the oil conduit 182 which is provided with a relief valve 188 including a ball 184 and a spring 186 and thus, with this relief valve, the pressure within the torque converter 12 is maintained within normal operating pressure range. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to a tank 114.

Next, an explanation is made regarding the control unit 300 which controls the shift motor 110 and the lock-up solenoid 200. The shift motor 110 is a stepper motor and thus referred hereinafter to as the stepper motor.

Figure 4:
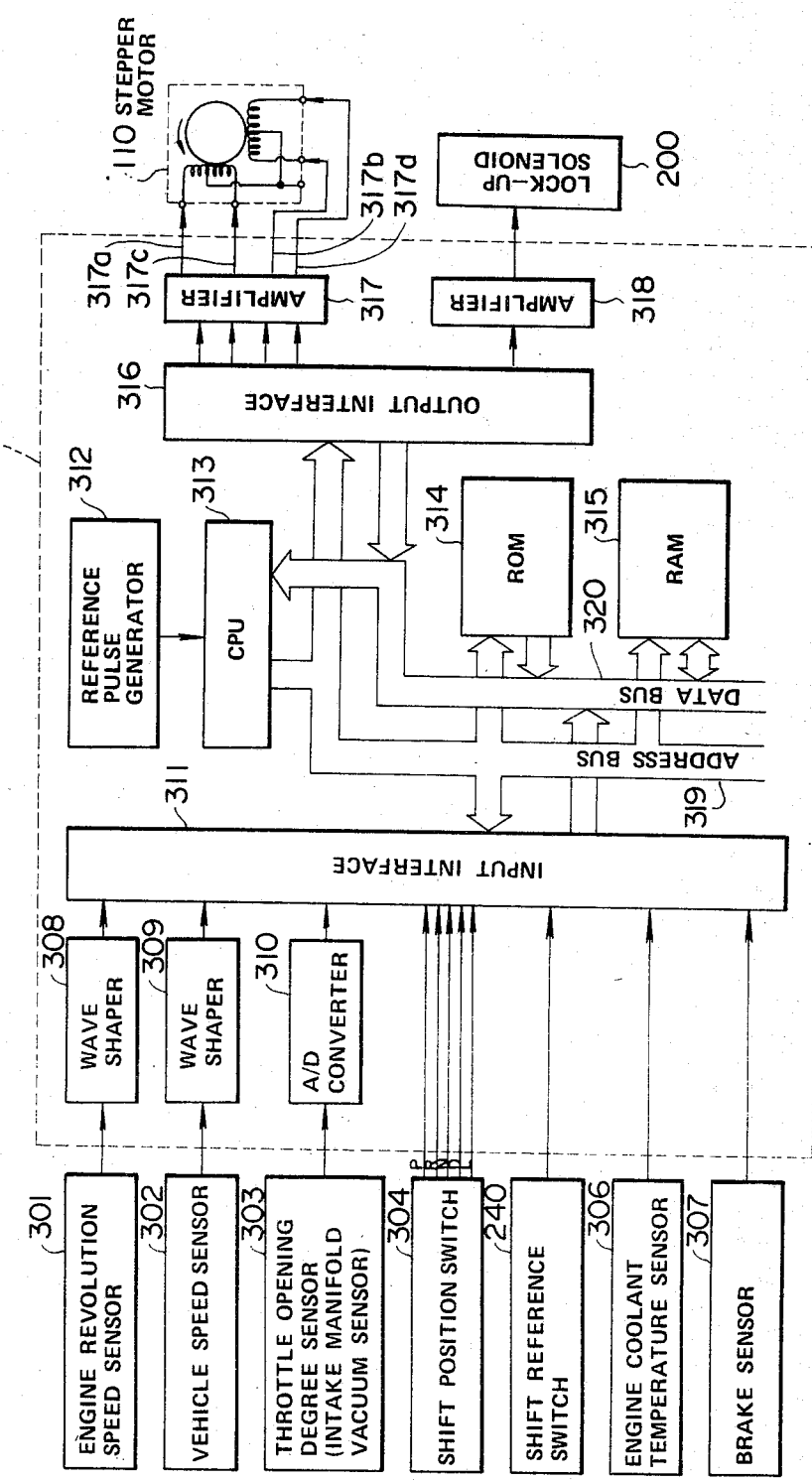
FIG. 4 is a block diagram showing a control unit for controlling a stepper motor 110 and a lock-up solenoid 200 shown in FIG. 3.

As shown in FIG. 4, the control unit 300 receives input signals from an engine revolution speed sensor 301, a vehicle speed sensor 302, a throttle opening degree sensor 303, a shift position switch 304, a shift reference switch 240, an engine coolant temperature sensor 306, and a brake sensor 307. The engine revolution speed sensor 301 detects and engine revolution speed by measuring the number of ignition spark pluses of the engine per unit time, and the vehicle speed sensor 302 detects a vehicle speed by measuring the revolution of the output shaft of the continuously variable transmission. The throttle opening degree sensor 303 detects the engine load by measuring the engine throttle opening degree, and generates and electric voltage signal. The throttle opening degree sensor 303 may be replaced with an intake manifold vacuum sensor or a fuel flow rate sensor. The shift position switch 304 detects which one of the range positions, namely, P range, N range, D range, and L range, is selected by the manual valve 104. The shift reference switch 240 is turned on when the sleeve 162 of the shift operating mechanism 112 assumes a position corresponding to the largest reduction ratio. For this purpose, the shift reference switch 240 is disposed such that it is turned on when the sleeve 162 is moved to the rightward limit position viewing in FIG. 3. The engine coolant temperature sensor 306 generates an electric voltage signal representative of the engine coolant temperature. The brake sensor 307 detects whether or not the vehicle brake is actuated. The sensor output signals generated by the engine revolution speed sensor 301 and vehicle speed sensor 302 are sent to an input interface 311 after passage through wave shapers 308 and 309, respectively. The electric voltage from the throttle opening degree sensor 303 is converted by an analog-digital (A/D) converter 310 into a digital signal before being sent to the input interface 311. In addition to the input interface 311 the shift control unit 300 comprises a reference pulse generator 312, a CPU (Central Processor Unit) 313, a ROM (Read Only Memory) 314, a RAM (Randam Access Memory) 315, and an output interface 316, which are linked with each other by an address bus 319 and a data bus 320. The reference pulse generator 312 generates reference pulses with which the CPU 313 is actuated. The ROM 314 stores programs necessary for controlling the stepper motor 110 and lock-up solenoid 200 and data necessary for controlling them. The RAM stores various parameters necessary for processing information from each of the sensors and switches and parameters necessary for controlling the stepper motor 110 and lock-up solenoid 200. Output signals from the control unit 300 are sent to the stepper motor 110 and lock-up solenoid 200 via respective amplifiers 317 and 318.

Hereinafter, a concrete explanation is made regarding a control method carried out by this control unit 300 in controlling the stepper motor 110 and lock-up solenoid 200.

The control may be divided into two routines, one being a lock-up solenoid control routine 500, the other being a stepper motor control routine 700.

Figure 5:
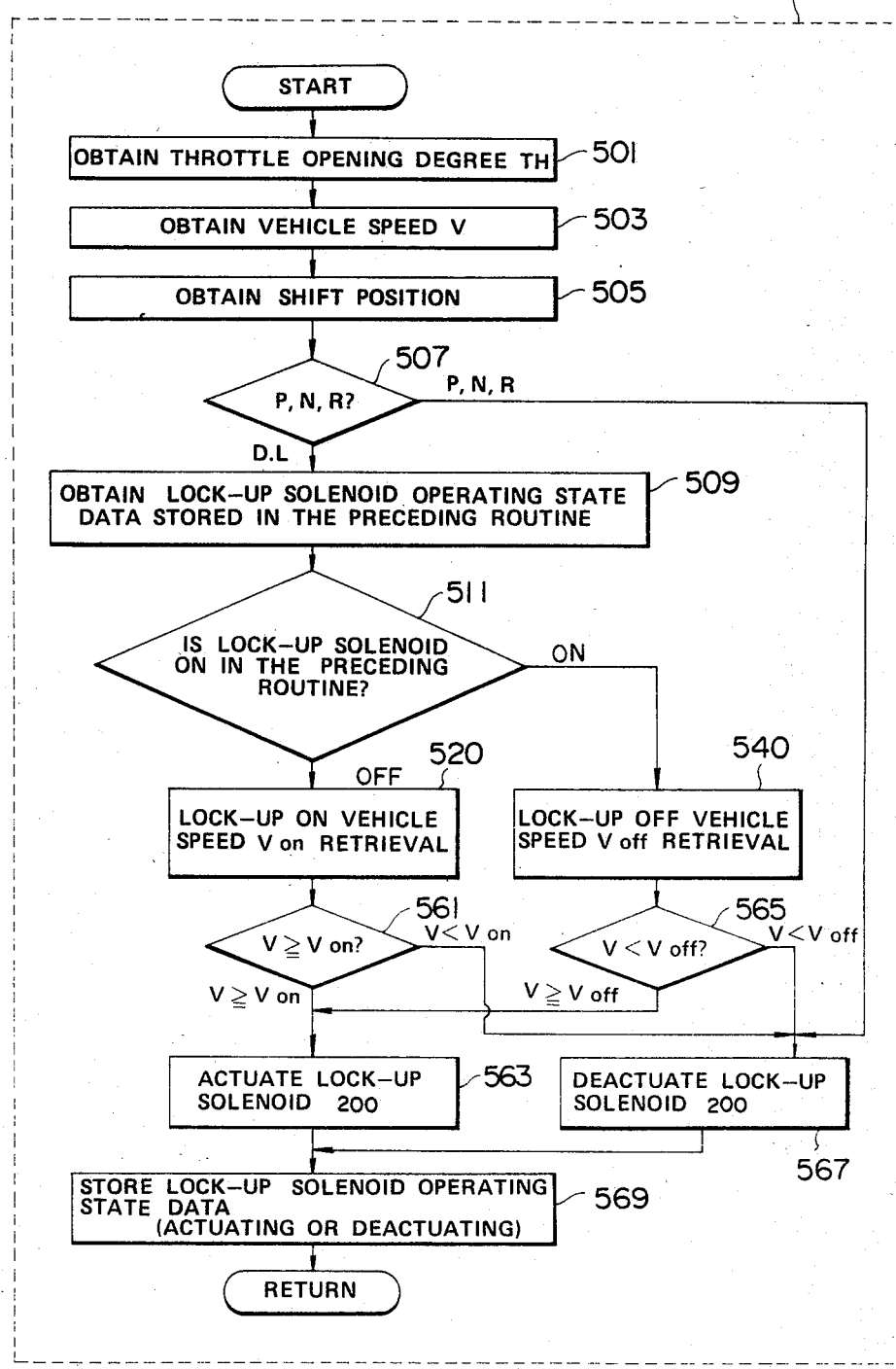
FIG. 5 is a flow chart of a lock-up solenoid control routine.
Figure 6:
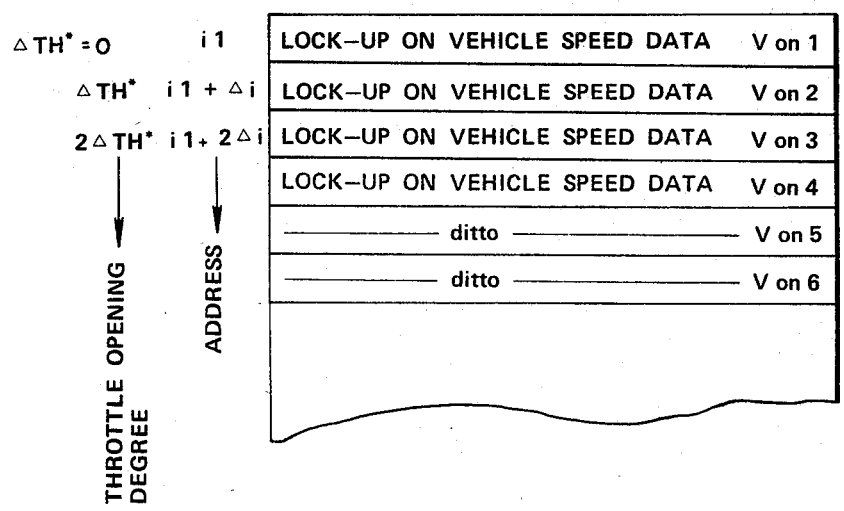
FIG. 6 is a diagrammatic view illustrating how lock-up on vehicle speed data are stored in a ROM 314 shown in FIG. 4.
Figure 7:
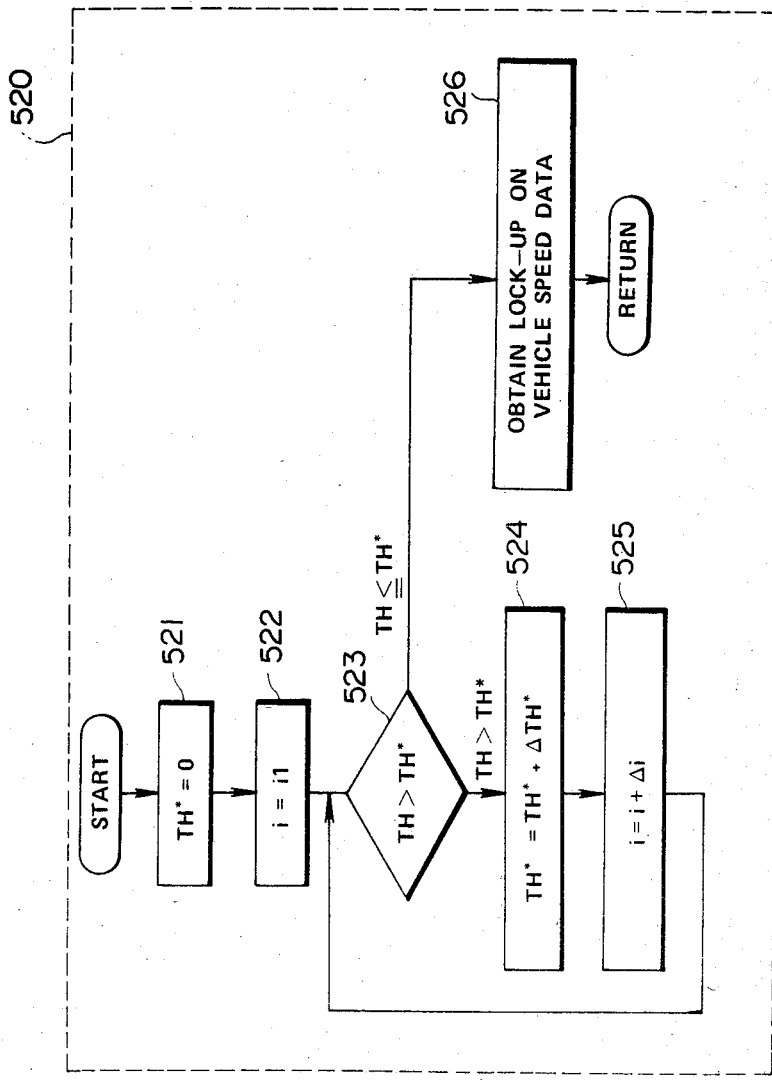
FIG. 7 is a flow chart showing a data retrieval routine for lock-up on vehicle speed data.

First of all, the control of the lock-up solenoid 200 is explained. The lock-up solenoid control routine 500 is shown in FIG. 5. The lock-up solenoid control routine 500 is executed once per a predetermined period of time. Thus, the execution of the following routine is repeated after a short period of time. A throttle opening degree signal TH indicative of the engine load is obtained from the throttle opening degree sensor 303 in step 501, then a vehicle speed indicative signal V is obtained from the vehicle speed sensor 302 in step 503 and after that a shift position indicative signal is obtained from the shift position switch 304 in step 505. A determination is made in step 507 whether any one of the P range, N range and R range is selected, and if the determination result reveals that the P range or N range or R range is selected, the lock-up solenoid 200 is deactuated (off state) in step 567 and then, in step 569, the present state of the lock-up solenoid 200 is stored in terms of a lock-up solenoid operating state data in the RAM 315 before the program returns to START of the routine 500. It will now be understood that as long as the P range or N range or R range is selected, the lock-up solenoid 200 is not energized and thus the torque converter 12 is in the non lock-up state. If the determination made in the step 507 shows that the D range or L range is selected, the lock-up solenoid operating state data stored in the preceding routine is obtained from the RAM 315 in step 509, and then a determination is made in step 511 whether or not the lock-up solenoid 200 was actuated (or in the on state) in the preceding routine. If in the preceding routine the lock-up solenoid 200 was not actuated (or in the off state), the data are retrieved in step 520 relating to a vehicle speed value (a lock-up on vehicle speed value Von) above which the lock-up solenoid 200 is to be actuated. The data retrieval routine 520 is described in connection with FIGS. 6, 7 and 8. Lock-up on vehicle speed data Von, such as, Von1-~Von6, are stored in the ROM 314 for various throttle opening degrees as shown in FIG. 6. Referring to FIG. 7, illustrating the data retrieval routine 520, a reference throttle opening degree TH* is set to zero in step 521 which represents an idle position and then an address i for the ROM 314 is given a number i1 that corresponds to the number zero of the reference throttle opening degree TH* (in step 522). Then, the actual throttle opening degree TH is compared with the reference throttle opening degree TH* (in step 523). If the actual throttle opening degree TH is smaller than or equal to the reference throttle opening degree TH*, the number i1 gives an address in the ROM 314 where an optimum lock-up on vehicle speed data Von corresponding to the actual throttle opening degree TH is stored and the lock-up on vehicle speed data Von is obtained from the address given by the number i1 (in step 526). On the other hand, if the actual throttle opening degree TH is greater than the reference throttle opening degree TH* as a result of the determination conducted in the step 523, the reference throttle opening degree TH* is increased by a predetermined value ΔTH* (in step 524) and address i is increased by a predetermined value Δi (in step 525). Thereafter, the program returns to the step 523 again where the actual throttle opening degree TH is compared with the reference throttle opening degree TH*. By repeating a chain of these steps (steps 523, 524 and 525), the number of the address i in the ROM 314 is given where a lock-up on vehicle speed data Von corresponding to the actual throttle opening degree TH is stored. Then, the lock-up on vehicle speed data Von is obtained from the address i.

Referring again to FIG. 5, after the completion of the data retrieval routine 520 the lick-up on vehicle speed data Von is compared with the actual vehicle speed V (in step 561) and if the actual vehicle speed V is higher than or equal to the lock-up on vehicle speed Von, then the lock-up solenoid 200 is actuated (in step 563), whereas if the relationship is reversed, the lock-up solenoid 200 is not actuated (in step 567), and then operating state data indicates an actuated state or a deactuated state is stored in the RAM 315 (in step 569).

If, in the step 511, the lock-up solenoid 200 was found to be actuated in the preceding routine, a retrieval routine for vehicle speed data Voff (a lock-up off vehicle speed) below which the lock-up is to be released is executed (in step 540). This data retrieval routine 540 is substantially the same in operation as the data retrieval routine 520 for lock-up on vehicle speed data Von (only difference being in the stored data as follows) and therefore the explanation thereof is omitted.

Figure 8:
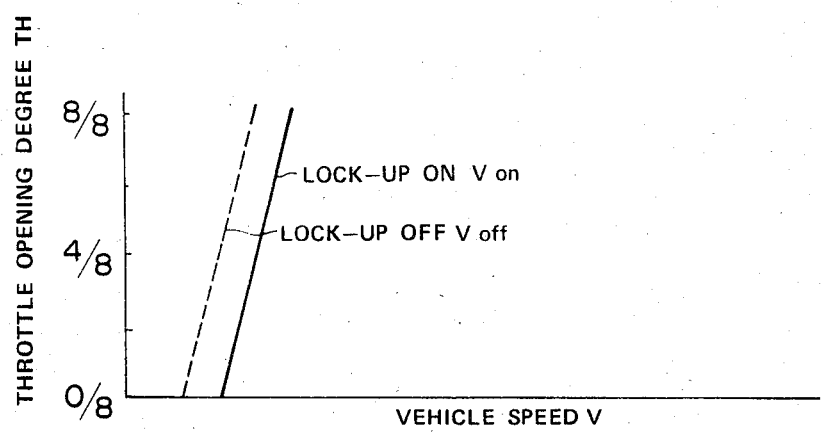
FIG. 8 is a graph showing a relationship between a lock-up on vehicle speed Von and a lock-up off vehicle speed Voff.

The lock-up on vehicle speed data Von and the lock-up off vehicle speed data Voff have the relationship as shown in FIG. 8. The relationship that Von is greater than Voff provides a hysterisis. This prevents the occurrence of hunting of the lock-up solenoid 200.

After the completion of the step 540, the lock-up off vehicle speed data Voff which has been retrieved in the step 540 is compared with the actual vehicle speed V in step 565, and if the vehicle speed V is higher than or equal to the lock-up off vehicle speed Voff, the lock-up solenoid 200 is actuated in step 563. If V is lower than Voff, the lock-up solenoid 200 is deactuated in step 567. Then the lock-up solenoid operating state indicative data is stored in the RAM 315 before the program returns to START.

Hereinafter, the stepper motor control routine 700 for the stepper motor 110 will be explained in connection with FIGS. 9(a), 9(b) and 9(c). The stepper motor control routine 700 is executed once per a predetermined period time. Thus, the execution of the following routine is repeated after a short period of time. First, the solenoid operating state data which was stored in the step 569 (see FIG. 5) of the lock-up solenoid control routine 500 is obtained in step 698 (see FIG. 9(a)), and a determination is made of the lock-up state in step 699. If the lock-up solenoid 200 was actuated, the execution of a routine beginning with a step 701 starts, whereas if the lock-up solenoid 200 was not actuated, the execution of a chain of steps beginning with step 713 (see FIG. 9(b)) starts. In the latter case, the control is carried out, in a manner described later, such that the largest reduction ratio is maintained. That is, the largest reduction ratio is maintained during operation with the torque converter 12 in the non lock-up state.

If, in step 699, the lock-up solenoid 200 is actuated, the throttle opening degree TH is obtained from the throttle opening degree sensor 303 in step 701, then the vehicle speed V is obtained from the vehicle speed sensor 302 in step 703, and after that then the shift position is obtained from the shift position switch 304 (in step 705). Subsequently, a determination is made whether the present shift position is the D range in step 707. If the present shift position is the D range, a D range shift pattern data retrieval routine is executed in step 720.

Figure 10:
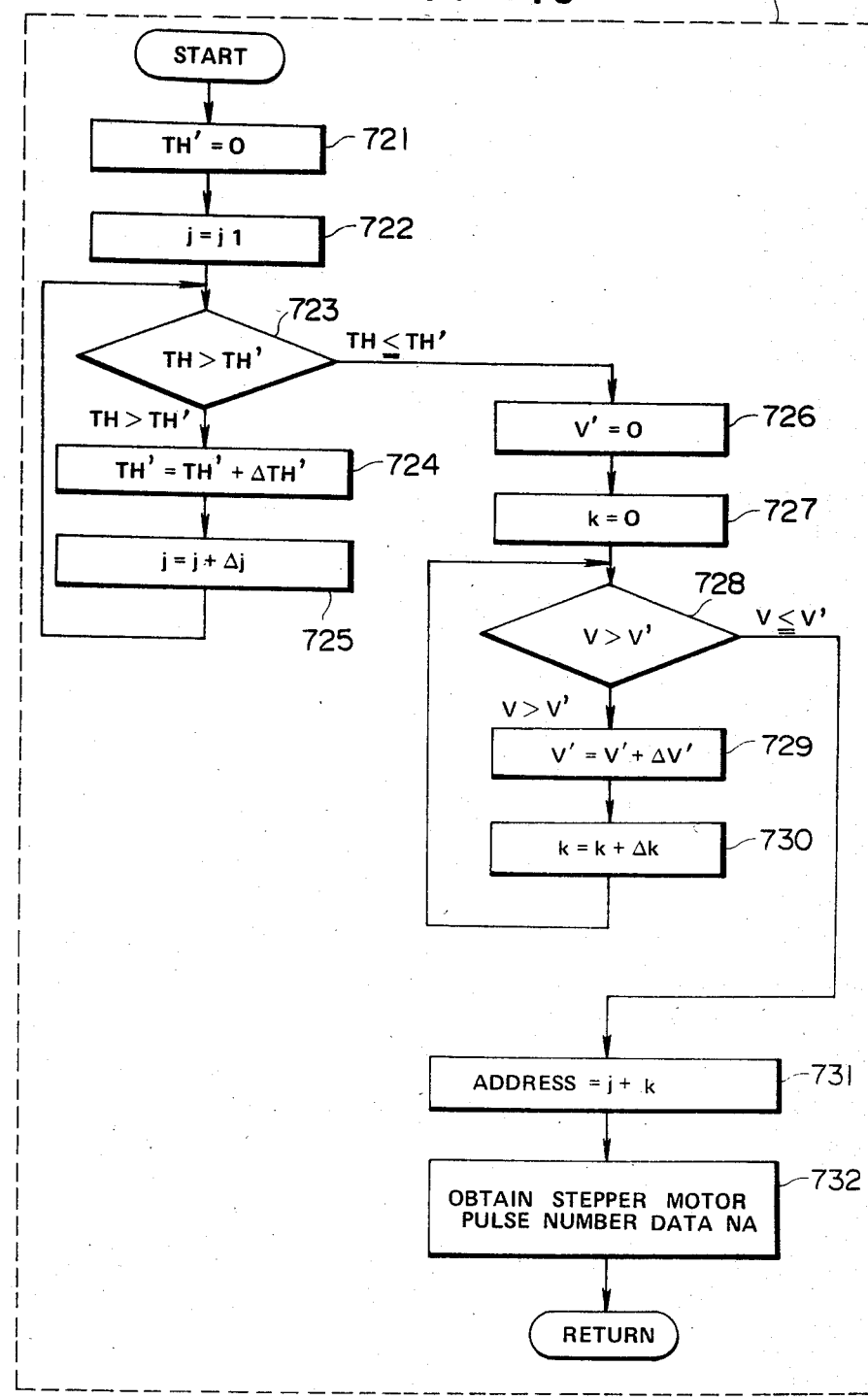
FIG. 10 is a flow chart showing a D range pattern data retrieval routine.

The D range shift pattern data retrieval routine in step 720 provides a desired optimum reduction ratio indicative signal. The desired reduction ratio indicative signal represents a desired optimum reduction ratio for the detected operating condition of the automotive vehicle and is expressed in terms of a number of pulses ND which is hereinafter called as a stepper motor pulse number. The D range shift pattern data retrieval routine is executed in a manner illustrated in FIG. 10. The stepper motor pulse number data ND are stored in the ROM 314 in a matrix shown in FIG. 11. The vehicle speed values are arranged along the lateral axis and the throttle opening degree values are arranged along the vertical axis (the vehicle speed increases toward the right in FIG. 11 and the throttle opening degree increases toward the bottom in FIG. 11). Referring to the D range shift pattern data retrieval routine 720 shown in FIG. 10, a reference throttle opening degree TH' is given a zero value which corresponds to the idle state in step 721 and an address j of the ROM 314, where stepper motor pulse number data which corresponds to a zero throttle opening degree is given a number j' in step 722. Subsequently, the actual throttle opening degree TH is compared with the reference throttle opening degree TH' in step 723. If the actual throttle opening degree TH is greater than TH', the reference throttle opening degree TH' is increased by $\Delta TH'$ in step 724 and the address j is increased by a predetermined value $\Delta j$ in step 725. After this step, the actual throttle opening degree TH is compared with the reference throttle opening degree TH' again (in step 723), and if the actual throttle opening degree TH stays greater than TH', the steps 724, 725 and 723 are repeated. After the execution of the steps 723, 724 and 725 has been repeated, the number j corresponding to the actual throttle opening degree TH is given when the actual throttle opening degree TH becomes equal or smaller than the reference throttle opening degree TH'. Subsequently, steps 726, 727, 728, 729 and 730 are executed in relation to vehicle speed V. As a result, the number k is given which corresponds to the actual vehicle speed V. Then, the number k thus given is combined with the number j in step 731, thus producing an address corresponding to a set consisting of the actual throttle opening degree TH and the actual vehicle speed V, and the stepper motor pulse number data ND is obtained from this address in step 732. The pulse number data ND thus obtained shows a desired stepper motor pulse number to be given for the actual throttle opening degree TH and the actual vehicle speed V. The D range shift pattern data retrieval routine 720 ends with the step of retrieving the pulse number data ND before the program returns to START.

Figure 9:
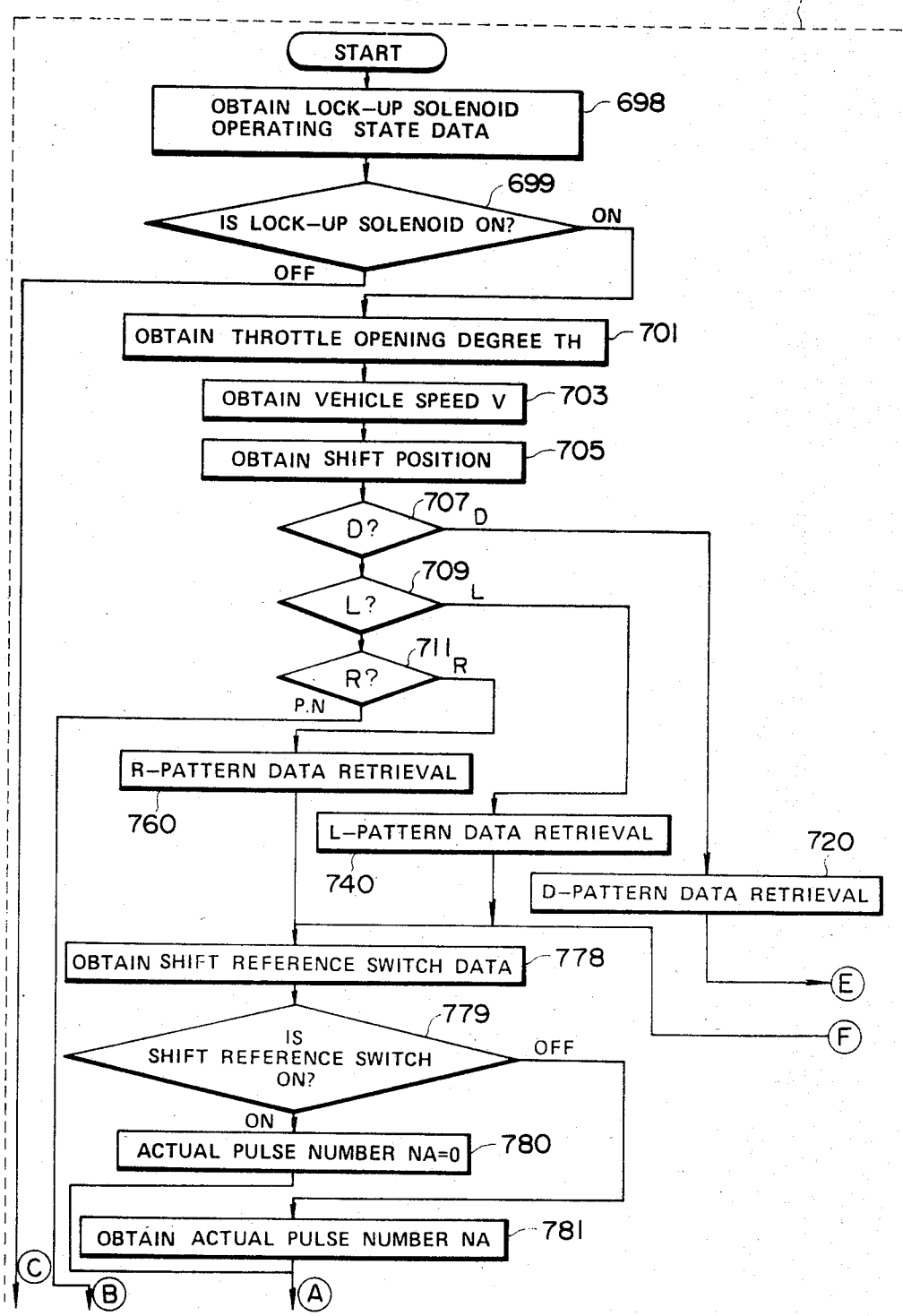
FIGS. 9(a), 9(b) and 9(c) illustrate a flow chart showing a stepper motor control routine.
Figure 9B:
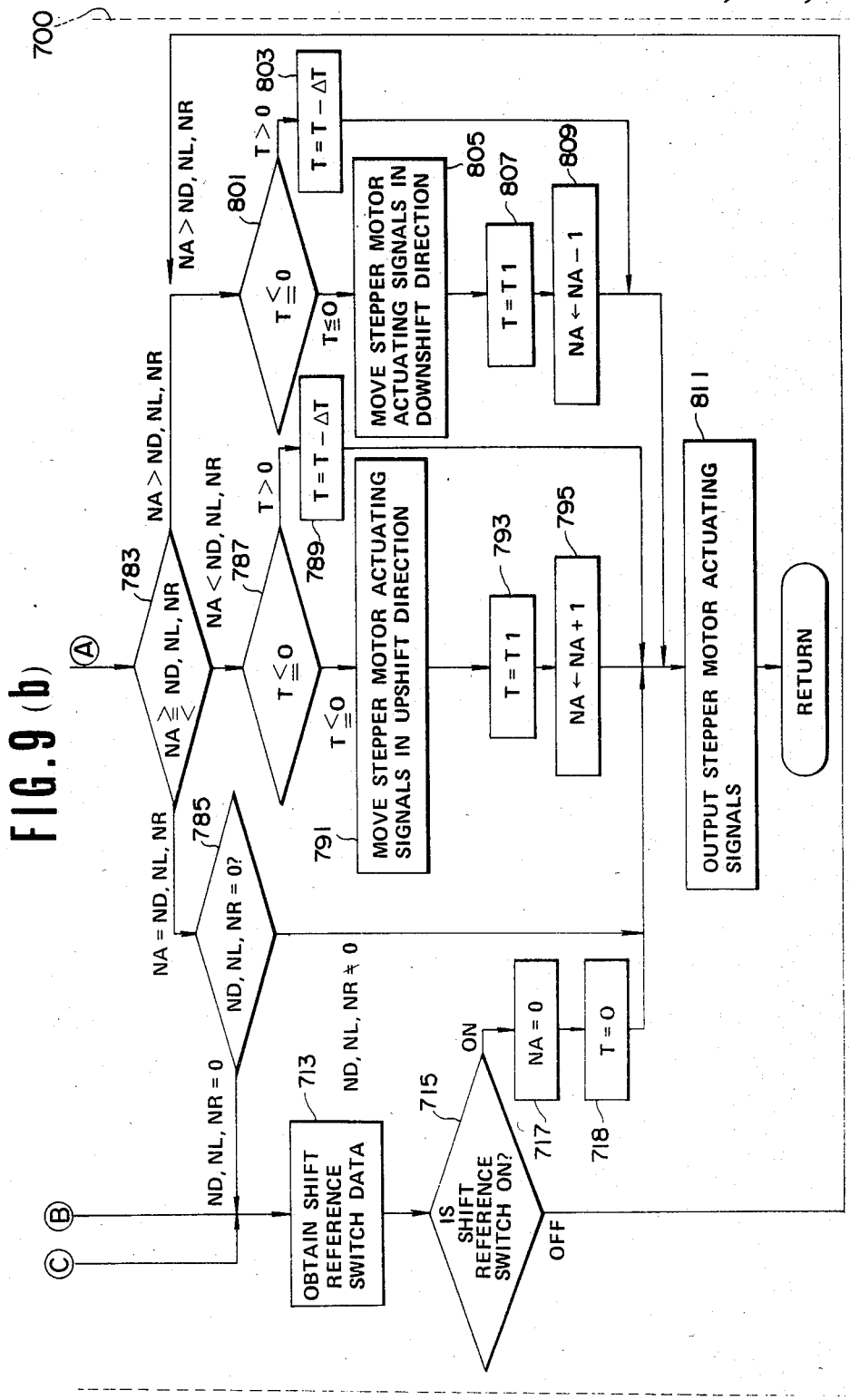
Figure 9C:
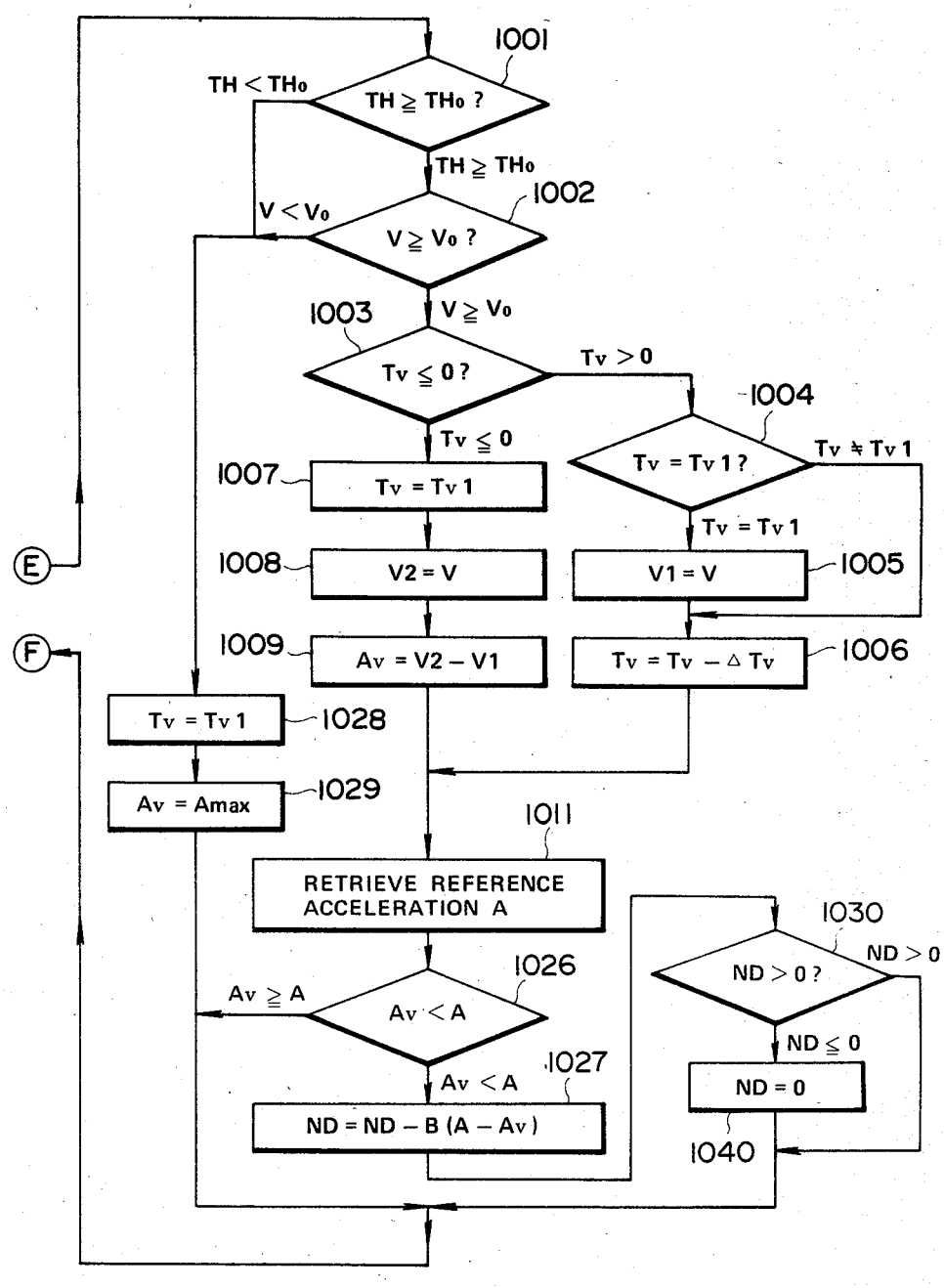

Next, as shown in FIG. 9(c), a determination is made in a step 1001 whether the throttle opening degree TH is greater than a predetermined throttle opening degree value THo (i.e., a relatively small throttle opening degree value). If TH is less than THo, i.e., in the case when the throttle opening degree is small, a timer value Tv, which is later described, is given a predetermined value Tv1 (in a step 1028) and an acceleration data Av, which is later described, is given a maximum value Amax (in a step 1029) and then the program goes to a later described step 778. Thus, the pulse number ND is not corrected. If, on the other hand, the throttle opening degree TH is greater than or equal to the predetermined throttle opening degree value THo (in step 1001), a determination is made whether the vehicle speed V is greater than a predetermined vehicle speed value Vo (this value Vo being greater than the lock-up off and on vehicle speeds). If the vehicle speed V is less than Vo, the program goes to the above mentioned steps 1028 and 1029, while, if the vehicle speed V is greater than or equal to Vo, the following steps 1003 to 1009 are executed to compute a change in vehicle speed during a predetermined time duration (i.e., vehicle acceleration). Referring to these steps, a determination is made in step 1003 whether the timer value Tv is negative or not. A timer value Tv, which is an address in the RAM where the timer value is stored, is given a certain positive value Tv1 as a result of initialization upon applying power. Since, in the intial routine, Tv is equal to Tv1 and thus is greater than zero, the program goes to step 1004. In the step 1004, a decision is made whether Tv is equal to Tv1 and if Tv is equal to the Tv1, a vehicle speed V1 in the RAM 315 is replaced by a new vehicle speed V obtained in the present routine in step 1005. In the next step 1006, the timer value Tv is decreased by a predetermined value $\Delta Tv$. In the following step 1011, a reference acceleration A is retrieved. This reference acceleration retrieval routine in step 1011 is described later in connection with FIGS. 22 and 23. Since, in the next routine, the timer valve Tv becomes equal to tv1−$\Delta Tv$ and thus Tv is not equal to Tv1 (in step 1004), the program goes directly to step 1006 bypassing the step 1005. In the step 1006, the timer value Tv is decreased by $\Delta Tv$ before returning to the step 1011. As a result, the timer value Tv is decreased by $\Delta Tv$ in each routine and after elapse of a predetermined time period which is determined by Tv1 and $\Delta Tv$, the timer value Tv becomes negative. If, in the step 1003, the timer value Tv is negative, the program goes to step 1007 wherein Tv is set at Tv1 again. Then, the vehicle speed V2, which is stored at an address in the RAM 315, is replaced by the vehicle speed V which was obtained in the step 703 (see FIG. 9(a)). In the next step 1009, the vehicle speed V1 obtained in the step 1005 in the past routine when Tv was equal to Tv1 (i.e., a vehicle speed obtained Tv1 ago) is subtracted from the vehicle speed V2, resulting in an change in vehicle speed during the predetermined time period, i.e., an actual acceleration Av=V2−V1.

Figure 22:
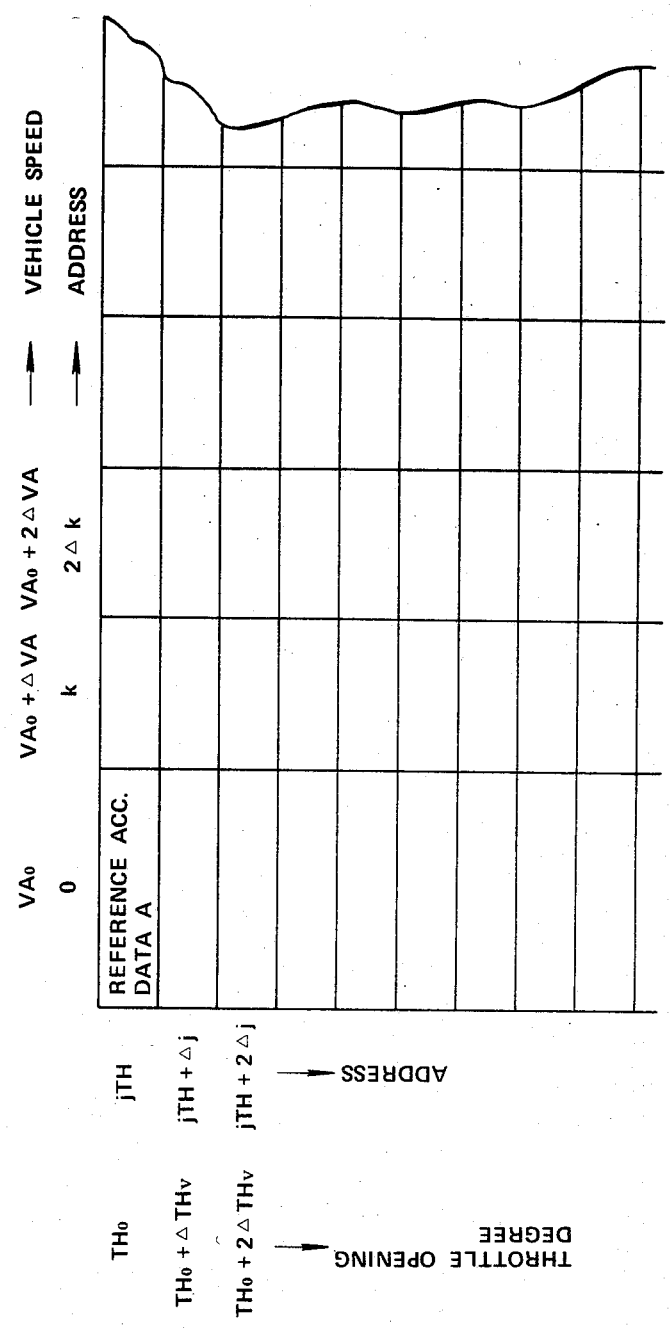
FIG. 22 is a diagrammatic view illustrating how reference acceleration data are stored in a matrix in the ROM 314 versus throttle opening degree and vehicle speed.
Figure 23:
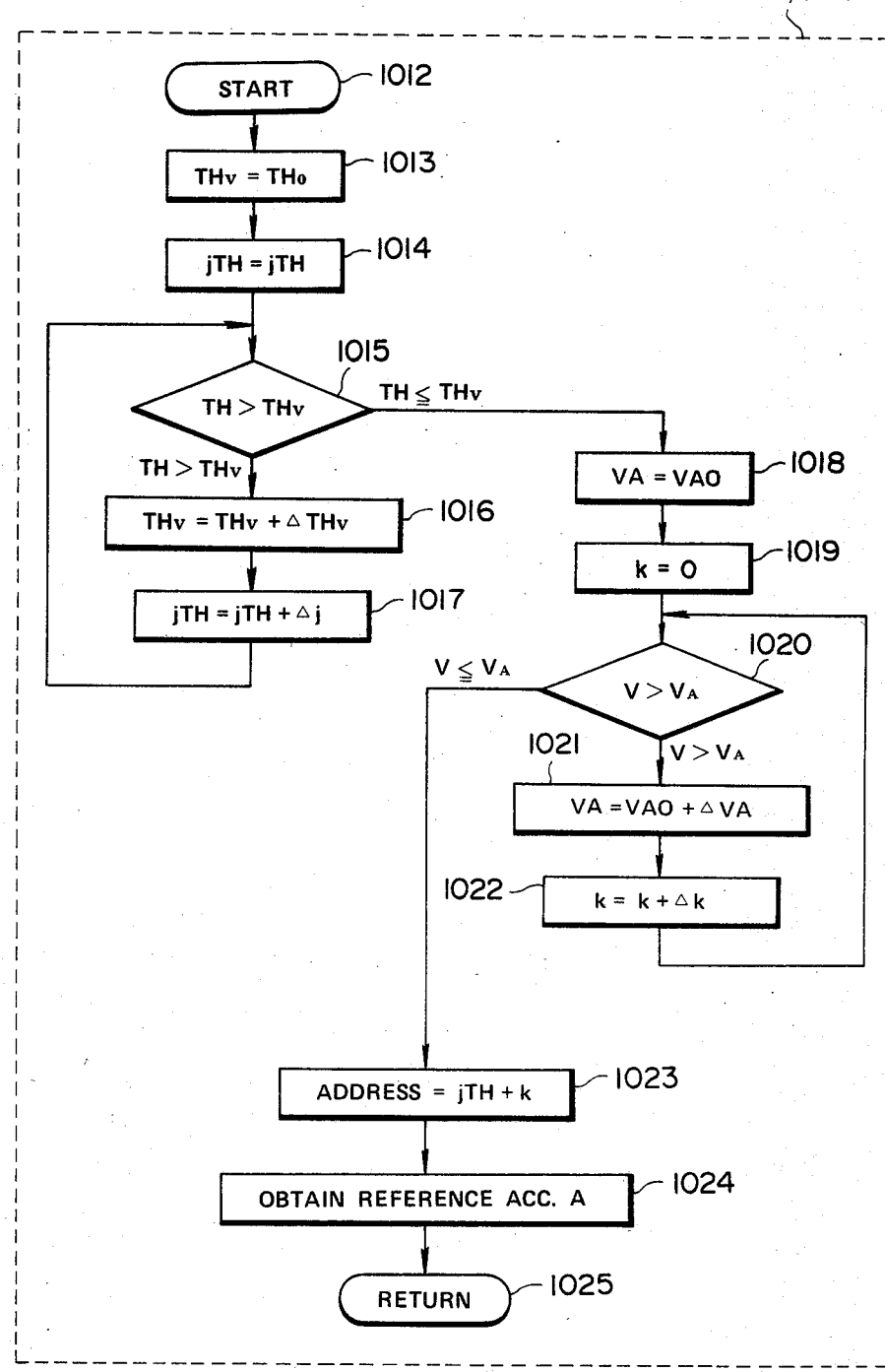
FIG. 23 is a flow chart showing a reference acceleration data retrieval routine.

Next, referring to FIGS. 22 and 23, the retrieval of reference acceleration A (in step 1011) is described. As the data of the reference acceleration A, accleration values are given for various throttle opening degrees and vehicle speeds when the automotive vehicle travels through flat terrain with a reduction ratio variable in the D range shift pattern. Each of the various acceleration values is stored in a location addressed by a number jTH+K in the ROM 314 wherein the primary address number jTH corresponds to throttle opening degree and the secondary address number K corresponds to vehicle speed as will be readily understood from the illustration in FIG. 22. The reference acceleration retrieval routine in step 1011 is illustrated by a flow chart shown in FIG. 23. The retrieval routine in step 1011 is similar to that of the before mentioned D range shift pattern retrieval routine in step 720. Referring to FIG. 23, reference throttle opening degree THv is set at THo (in step 1013) and the address jTH in the ROM 314 is given a number jTHo (in step 1014). Then, the actual throttle opening degree TH is compared with a reference throttle opening degree THv (in step 1015), and if the actual throttle opening degree TH is greater than THv, THv is increased by a predetermined value ΔTHv (in step 1016) and jTH is increased by a predetermined value Δj (in step 1017) before returning to step 1015. Then, the actual throttle opening degree TH is compared with the reference throttle opening degree THv again (in step 1015). If the actual throttle opening degree TH stays greater than THv, the program returns to the step 1015 again after executing the above mentioned steps 1016 and 1017. As a result, the number jTH corresponding to the actual throttle opening degree TH is given when TH becomes less than or equal to THv. Similar steps 1018, 1019, 1020, 1021 and 1022 are executed in relation to the vehicle speed V. This gives a number k corresponding to the actual vehicle speed V. The number jTH is combined with the number k in step 1023, resulting in the number of an address for the actual throttle opening degree TH and the actual vehicle speed V. The data of the reference acceleration is obtained at the location in the ROM 314 indicated by the address before the program returns to START. The reference acceleration retrieval routine terminates with obtaining the appropriate reference acceleration value.

Turning back to FIG. 9(c), the actual acceleration Av is compared with the reference acceleration A (in step 1026), and if the actual acceleration Av is greater than or equal to A, the program goes to the step 778 shown in FIG. 9(a). The following steps are performed based on the desired pulse number ND retrieved in the D range shift pattern retrieval routine and the shift pattern is not corrected. If the actual acceleration Av is less than A (i.e., when a shortage in power is experienced due to an insufficient degree of vehicle acceleration for the actual throttle opening degree), a correction value, in pulse number, B·(A−Av) (B: constant) which is proportional to the insufficient degree in vehicle acceleration is subtracted from the desired pulse number ND (in step 1027). Thus, in the step 1027, the desired optimum reduction ratio is corrected in proportion to the insufficent degree in acceleration to a value on the larger reduction ratio side. Then, the corrected pulse number ND is compared with a zero value (in step 1030), and if ND is less than or equal to zero, ND is given a zero value (in step 1040) and ND is greater than zero, the program goes to the step 778.

Referring to FIG. 9(a), if the D range is not selected as the result of the determination in the step 707, then a determination is made whether the L range is selected in step 709, and if the L range is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND (the difference between the pulse number data ND and NL will be described hereinafter) and are stored at different addresses in the ROM 314. A detailed explanation thereof is, therefore, omitted.

If neither the D range nor the L range is selected, a determination is made whether the R range is selected in step 711. If the R range is selected, a R range shift pattern data retrieval routine 760 is executed in step 760. The R range shift pattern data retrieval routine 760 is substantially similar to the D range shift pattern data retrieval routine 720 except that different stepper motor pulse number data NR are stored and thus a detailed explanation thereof is omitted.

After the data retrieval of the suitable pulse number data ND, NL or NR in the respective step 720, 740 or 760, a shift reference switch data is obtained from the shift reference switch 240 in step 778 and then a determination is made whether the shift reference switch 240 is in the on-state or the off-state in step 779. The shift reference switch data indicates whether the shift reference switch 240 is turned on or off. If the shift reference switch 240 is in the off state, the actual stepper motor pulse number data NA is retrieved from the RAM 315 in step 781. This pulse number data NA corresponds one to one to the actual rotary position of the stepper motor 110 unless there is any electric noise. If, in the step 779, the shift reference switch 240 is in on state, the pulse number data NA is given a zero value in step 780. The shift reference switch 240 is so designed as to be turned on when the sleeve 162 assumes a position corresponding to the largest reduction ratio. This results in the rotary position of the stepper motor 110 always corresponding to the largest reduction ratio position whenever the shift reference switch 240 is turned on. Because the actual pulse number data NA is given a zero value whenever the shift reference switch 240 is turned on, the pulse number data NA can correspond accurately to the actual rotary position of the stepper motor 110 should occurr a signal distortion due to electric noise. Consequently, signal distortion due to the accumulation of noise is eliminated. Subsequently, in step 783 (see FIG. 9(b)), the actual pulse number data NA is compared with the retrieved desired pulse number data ND, NL or NR.

Referring to FIG. 9(b), if the actual pulse number data NA is equal to the desired pulse number data ND, NL or NR as the result of step 783, a determination is made whether the desired pulse number ND, NL or NR is zero in step 785. In the case the desired pulse number ND, NL or NR is not zero when the reduction ratio is not the largest, the same stepper motor actuating signals (described hereinafter) as provided for in the preceding routine are sent out in step 811 before the program returns to START. If the desired pulse number ND, NL or NR is zero in the step 785, the shift reference switch data is obtained from the shift reference switch 240 in step 713, and a determination is made whether the shift reference switch 240 is in the on state or the off state in step 715. If the shift reference switch 240 is in the on state, the actual pulse number data NA is given a zero value in step 717, a stepper motor timer value T which will be described later is given zero in step 718, and then the same stepper motor actuating signals as those of the preceding routine which correspond to the zero pulse number are sent out in step 811. If, in step 715, the shift reference switch 240 is in the off state, the execution of the steps following the step 801, which will be described later, begins.

If, in the step 783, the actual pulse number NA is smaller than the desired pulse number ND, NL or NR, the stepper motor 110 needs to be actuated toward where the pulse number increases. First, a determination is made whether the timer value T is negative inclusive zero in step 787. If the timer value T is positive, then the timer value T is decreased by a predetermined value ΔT in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 110 are moved in the upshift direction by one stage in step 791 as described later. Then, the timer value T is given a predetermined positive value T1 in step 793; the stepper motor pulse number NA is increased by 1 in step 795, and the stepper motor actuating signals which have been moved by one stage in the upshift direction are sent out in step 811 before the program returns to START. This causes the stepper motor 110 to rotate toward the upshift direction by one unit.

If, in step 783, the present stepper motor pulse number NA is larger than the desired pulse number ND, NL or NR, a determination is made whether the timer value T is zero or negative in step 801. If the timer value T is positive, the timer value T is decreased by the predetermined value ΔT (in step 803), and the same stepper motor actuating signals as those of the preceding routine are sent out in step 811 before the program returns to START. After repeating this sequence of operations, the timer value T becomes zero or negative after elapse of a predetermined period of time because the decrement of the timer T by the predetermined value ΔT is repeated. When the timer value T becomes zero or negative, the stepper motor actuating signals are moved toward a downshift direction by one stage in step 805. Then the timer value T is given the predetermined positive value T1 in step 807; the stepper motor pulse number data NA is decreased by 1 in step 809, and the stepper motor actuating signals having been moved in the downshift direction are sent out (in step 811) before the program returns to START. This causes the stepper motor 110 to rotate in the downshift direction by one unit.

Figures 11, 12:
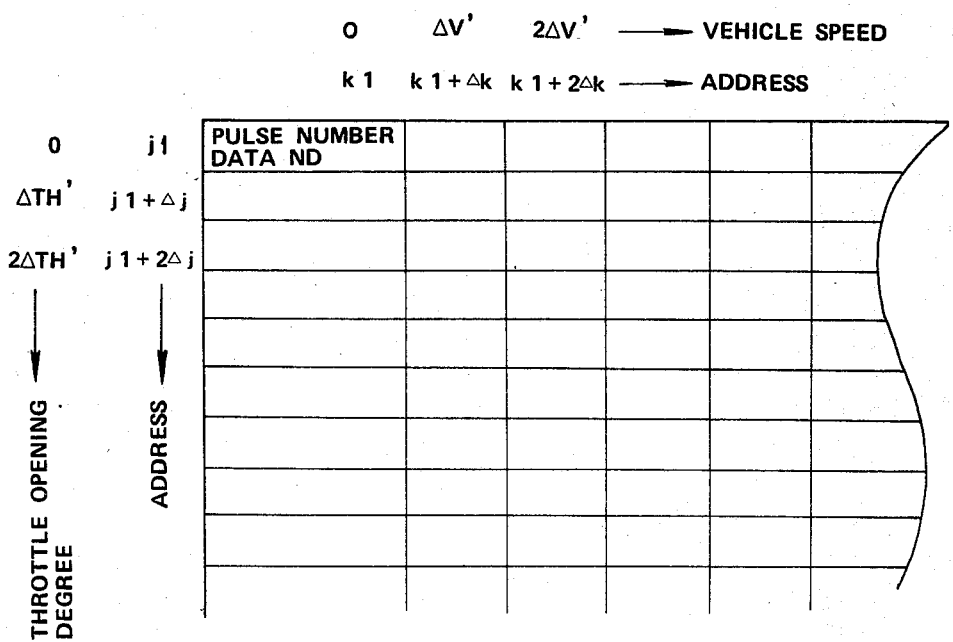
FIG. 11 is a diagrammatic view illustrating how pulse number data ND are stored in a matrix in the ROM 314 versus throttle opening degree and vehicle speed.
FIG. 12 is a chart illustrating various modes of stepper motor actuating signals applied to output leads 317a, 317c, 317b and 317d of the steper motor 110.
Figure 13:
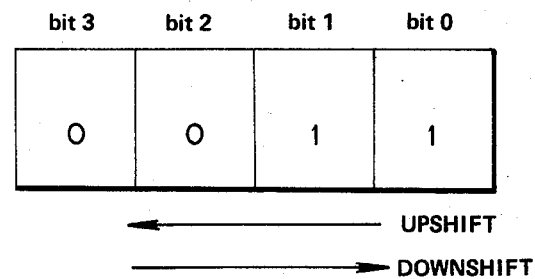
FIG. 13 is a diagrammatic view of the content of four bit positions corresponding to the mode A.
Figure 14:
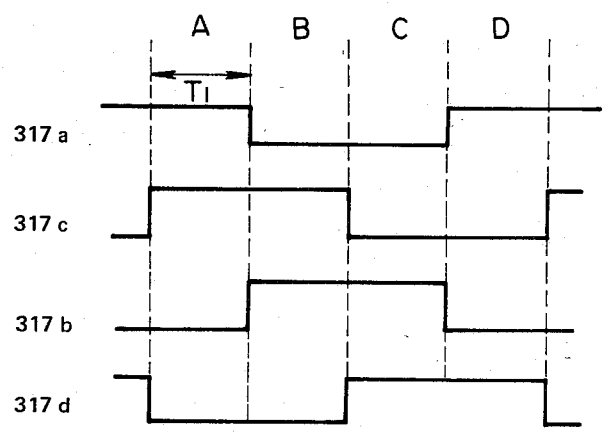
FIG. 14 is a timing diagram of the stepper motor actuating signals.

Referring to FIGS. 12 to 14 and particularly to FIGS. 13 and 14, the stepper motor actuating signals will now be described. The stepper motor 110 is connected with four output lead lines 317a, 317b, 317c, and 317d (see FIG. 4) having thereon respective signals which may vary in four modes A-D, and the stepper motor 110 rotates in the upshift direction (the direction denoted by an arrow X as shown in FIGS. 3 and 4) if the actuating signals are moved in the sequence of A→B→C→D→A, and the stepper motor 110 rotates in the reverse or downshift direction if the actuating signals are moved in the sequence of D→C→B→A→D. Referring to FIG. 13 which illustrates the content of the bits corresponding to the mode A of the actuating signals, the digit "1" is written in bit position 0, the digit "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 110 is to be rotated in the upshift direction, the bits are rotated to the right, i.e., the digits are moved one place to the left. When the stepper motor 110 is to be rotated one step in the downshift direction, the bits are rotated to the left, i.e., the digits are moved one place to the right.

The variation of the signals on the output lead lines 317a, 317c, 317b, and 317d upon upshifting is illustrated in FIG. 14. In FIG. 14, the period of time during which each of nodes A, B, C and D stays constant, agrees with the timer value T1 which has been obtained in the step 793 or 807.

As described above, the stepper motor actuating signals are moved to the left or in the upshift direction in step 791 when the actual pulse number, i.e., the actual reduction ratio, is smaller than the desired pulse number, i.e., the desired optimum reduction ratio, thus serving as actuating signals for rotating the stepper motor 110 in the upshift direction. In the reverse case, when the actual reduction ratio is larger than the desired optimum reduction ratio, the stepper motor actuating signals are moved to the right or in the downshift direction in step 805, thus serving as actuating signals for rotating the stepper motor 110 in the downshift direction. When the actual reduction ratio agrees with the desired optimum reduction ratio, the actuating signals are not moved to the left nor right, and the same actuating signals as those of the preceding routine are sent out. In this case, the stepper motor 110 will not rotate, thus maintaining the reduction ratio constant.

If, in the previously described step 711 shown in FIG. 9(a), the R range is not selected, i.e., if the P range or N range is selected, the execution of the step 713 and its following steps begins. The shift reference switch data is obtained from the shift reference switch 240 in step 713 and if the shift reference switch 240 is in the on state, the actual pulse number NA is given a zero value in step 717 and the stepper motor timer value T is given a zero value in step 718. Then, the same actuating signals as those of the preceding routine are sent out in step 811 before the program returns to START. If the shift reference switch 240 is in the off state, the steps following the step 801 are executed which have been described. That is, the stepper motor 110 is rotated in the downshift direction. Accordingly, the largest reduction ratio is maintained when the shift position is in the P or N range.

Hereinafter, a description is made as to how the desired optimum reduction ratio is determined.

Referring to FIGS. 15-19, a description will now be given of how the desired optimum reduction ratio is determined to satisfy the minimum fuel consumption rate curve during operation in the D range.

Figure 15:
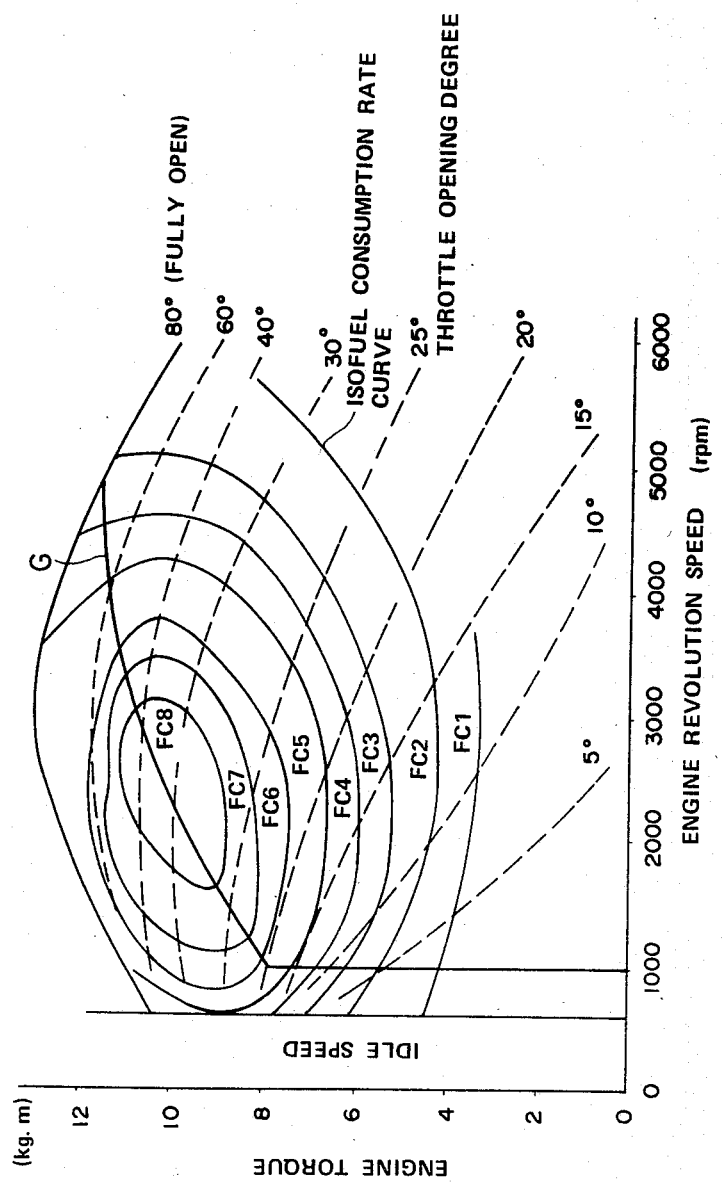
FIG. 15 is an engine performance map showing a minimum fuel consumption rate curve G.
Figure 16:
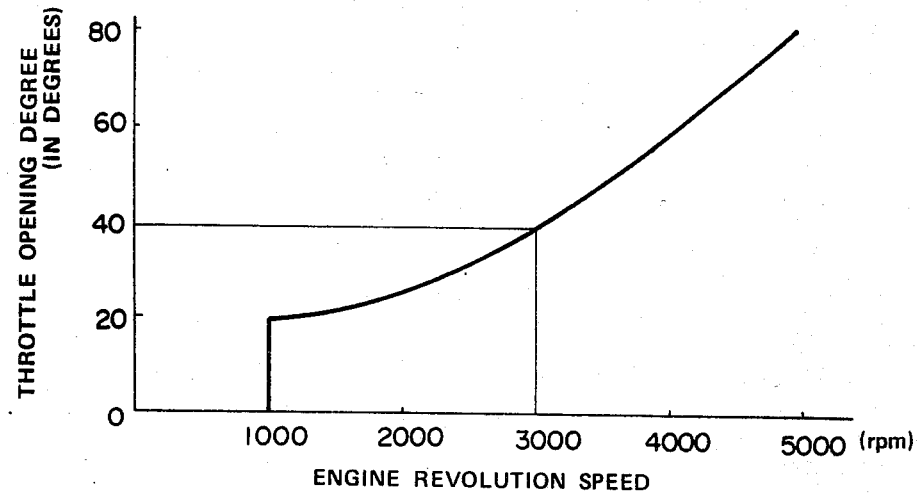
FIG. 16 is a graph showing the minimum fuel consumption rate curve expressed in terms of the throttle opening degree and engine revolution speed.
Figure 17:
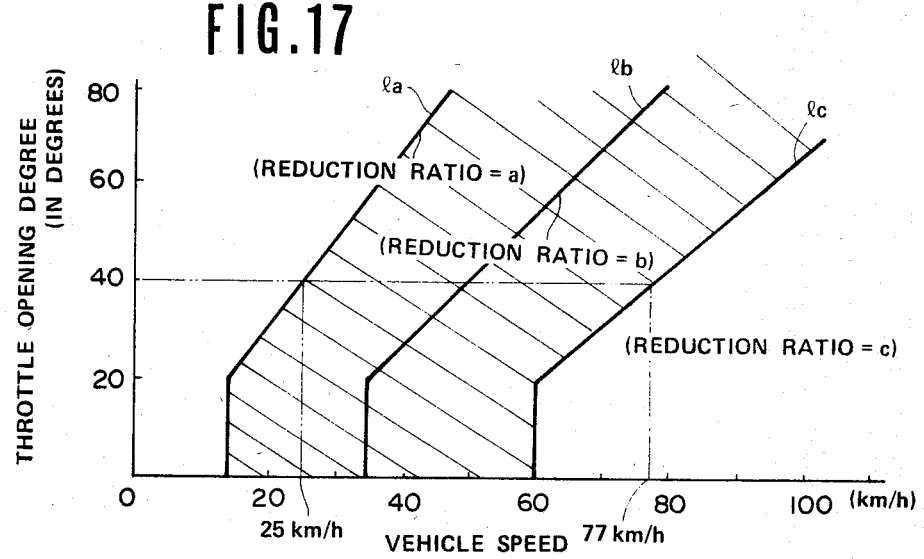
FIG. 17 is a graph showing the relationship shown in FIG. 16 expressed in terms of the throttle opening degree and vehicle speed for various reduction ratios.
Figure 18:
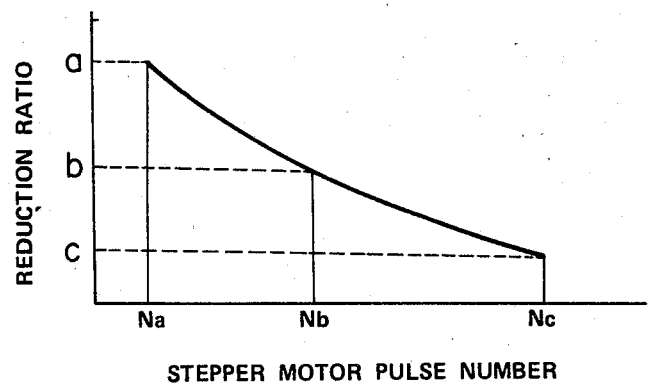
FIG. 18 is a graph showing a predetermined relationship of the reduction ratio with the stepper motor pulse number.
Figure 19:
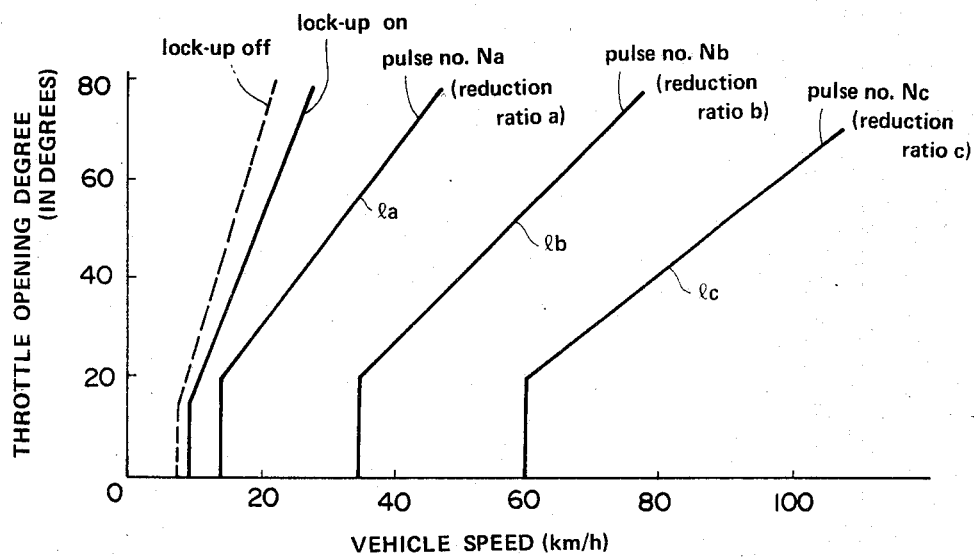
FIG. 19 is a graph showing a predetermined relationship shown in FIG. 16 expressed in terms of the throttle opening degree and vehicle speed for various pulse numbers.

Referring to FIG. 15, the engine performance map is shown. In FIG. 15, engine revolution speed is expressed on the axis of abscissas and engine torque on the axis of ordinates and there are shown engine torque vs., engine revolution speed characteristic curves, each for a throttle opening degree (each curve being accompanied by a throttle opening degree) and there are also shown isofuel consumption rate curves FC1~FC8 (fuel consumption rate reducing in this numerical order). In FIG. 15, the minimum fuel consumption rate curve is denoted by the character G and the most efficient operational state is obtained if the engine is operated on this curve G. In order to control the continuously variable transmission so as to operate the engine along the minimum fuel consumption rate curve G, the pulse number data ND for the stepper motor 110 are determined in the following manner. If the minimum fuel consumption rate curve G is expressed in terms of throttle opening degree and engine revolution speed, the result may be expressed in FIG. 16. As will be understood, a single engine revolution speed is given for any throttle opening degree. For example, the engine revolution speed 3000 rpm is given for the throttle opening degree 40°. As shown in FIG. 16, the minimum engine revolution speed 1000 rpm is given for low throttle opening degrees (smaller than about 20 degrees) since the drive system of the continuously variable transmission would exhibit resonance with the engine vibration if the lock-up clutch is engaged with the engine revolution speeds below this minimum engine revolution speed. Assuming engine revolution speed is N and vehicle speed V, then the reduction ratio S is given by the equation:

$$S = (N/V) \cdot k$$

where, k denotes a constant determined by the final reduction ratio and the radius of the tire. It will now be understood from the above equation and FIG. 16 that the desired optimum reduction ratio is determined by the vehicle speed V and the target engine revolution speed N which satisfies a predetermined relationship with the throttle opening degrees, i.e., engine load, as shown in FIG. 16. If the relationship shown in FIG. 16 is expressed in terms of vehicle speed rather than the engine revolution speed, the result may be expressed as shown in FIG. 17. Even with the same engine revolution speed, the vehicle speed differs from reduction ratio to reduction ratio and this fact is expressed in terms of a range of vehicle speed as shown in FIG. 17. Line la denotes the variation upon selecting the largest reduction ratio (reduction ratio a), and line lc denotes the variation upon selecting the smallest reduction ratio (reduction ratio c), where line lb denotes the variation upon selecting an intermediate reduction ratio b. For example, the vehicle can run at vehicle speeds from 25 km/h to 77 km/h with the throttle opening degree 40 while the reduction ratio decreases. The reduction ratio remains at a below 25 km/h and at c above 77 km/h with the throttle opening degree 40. A predetermined relationship exists between the position of the sleeve 162 of the shift operating mechanism 112 and a reduction ratio. This means that a predetermined relationship exists between the stepper motor pulse number applied to the stepper motor 110 (i.e., rotary position of the stepper motor 110) and the reduction ratio as shown in FIG. 18. Thus, the reduction ratios (a or b or c) shown in FIG. 17 can be converted into respective pulse numbers using the graph shown in FIG. 18. The result of this conversion is illustrated in FIG. 19. Also shown in FIG. 19 are the lock-up on and lock-up off vehicle speed lines shown in FIG. 8 from which it will be understood that the lock-up on and lock-up off vehicle speed lines are disposed on the lower vehicle speed side of the line la with the largest reduction ratio a.

Control of the continuously variable transmission with the shift pattern illustrated in FIG. 19 is as follows. Upon moving off from a standstill, the continuously variable transmission is maintained at the largest reduction ratio and the torque converter 12 is held in the non lock-up state. Therefore, a traction force strong enough for moving the vehicle off from the standstill is given. When the vehicle speed exceeds the lock-up on line, the lock-up clutch 10 of the torque converter 12 (see FIG. 1) engages, thus putting the torque converter 12 in the lock-up state. When the vehicle speed exceeds the line la as a result of an increase in the vehicle speed, the reduction ratio continuously varies between the reduction ratio and the reduction ratio c in such a manner as to satisfy the relationship denoted by the minimum fuel consumption rate curve G shown in FIG. 15. For example, if the throttle opening degree is increased from a state where the vehicle is running at a constant vehicle speed with a constant throttle opening degree in an operating range falling between lines la and lc, the desired engine revolution speed changes and the desired pulse number changes with the change in the desired revolution speed as determined by the relationship illustrated in FIG. 16. The stepper motor 110 rotates to a new rotary position in response to the new desired stepper motor pulse number, establishing a new reduction ratio, thus allowing the actual engine revolution speed to agree with the new target engine revolution speed. The engine is controlled to operate along with the minimum fuel consumption rate curve G of the engine since, as described before, the stepper motor pulse number is determined to satisfy the minimum fuel consumption rate curve G of the engine. In this manner, the reduction ratio is controlled by controlling the stepper motor pulse number since each reduction ratio corresponds uniquely to a single stepper motor pulse number.

From the description above, it will be understood that the desired optimum reduction ratio is determined by the vehicle speed and the desired engine revolution speed which satisfies the predetermined relationship with the engine load.

Figure 20:
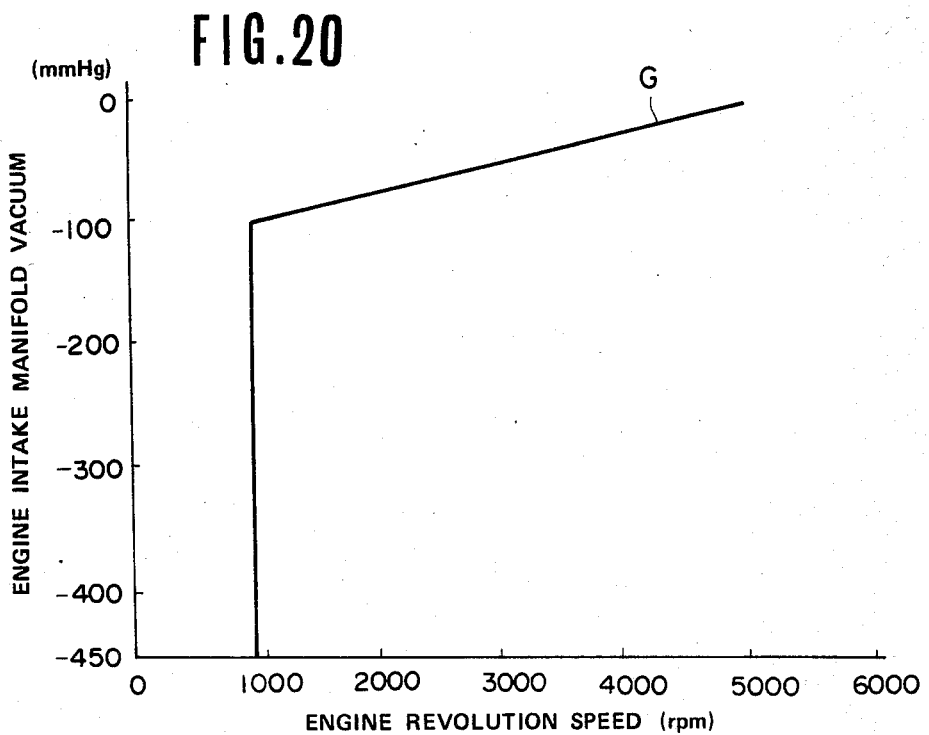
FIG. 20 is a graph showing the minimum fuel consumption rate curve expressed in terms of intake manifold vacuum and engine revolution speed.
Figure 21:
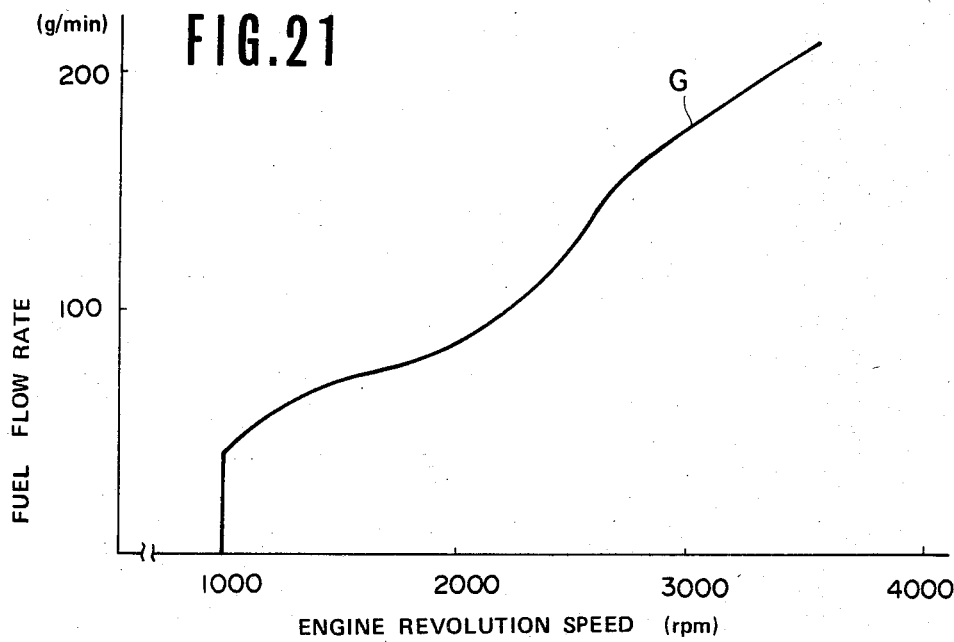
FIG. 21 is a graph showing the minimum fuel consumption rate curve expressed in terms of fuel flow rate.

In the embodiment described above, the control is based on the engine throttle opening degree, but it is also possible to carry out a similar control based on the intake manifold vacuum or the fuel flow rate. FIGS. 20 and 21 illustrate the minimum fuel consumption rate curves G for the latter two cases, respectively.

The above description has concentrated mainly on the shift pattern to be followed upon selecting the D range, but all that is necessary for operation in the L range or R range is to give data relating to different shift patterns from that in D range. For example, for the same throttle opening degree, a shift pattern for the L range is designed to give a larger reduction ratio as compared to the reduction ratio which is given by the shift pattern for the D range for the purpose of enhancing acceleration performance and ensuring adequate engine braking performance at zero throttle opening degree. In a shift pattern for the L range, a reduction ratio larger than the reduction ratio given by the shift pattern for the D range is given for the same throttle opening degree. These shift patterns can be accomplished simply by inputting appropriate predetermined pulse data. A more detailed explanation of the operation in the L and R ranges is omitted since the basic actions carried out to effect the control are the same as in the D range.

Next, a brief explanation will be given as to the engine coolant temperature sensor 306 and the brake sensor 307.

The engine coolant temperature sensor 306 is switched "on" when the engine coolant temperature is below a predetermined value (for example, 60° C.). When the engine coolant temperature sensor 306 is in the "on" state, the shift pattern for the D range is switched in response to this signal to a shift pattern having larger reduction ratios. This eliminates irregular running of the engine and engine power shortage which otherwise would take place upon start-up of a cold engine.

The brake sensor 307 is switched "on" when the foot brake is actuated. If the brake sensor 307 is in the "on" state and at the same time the throttle opening degree is zero, the shift pattern for the D range is switched to a shift pattern giving larger reduction ratios. This ensures strong engine braking upon depressing the brake when operating in the D range.

Figure 24:
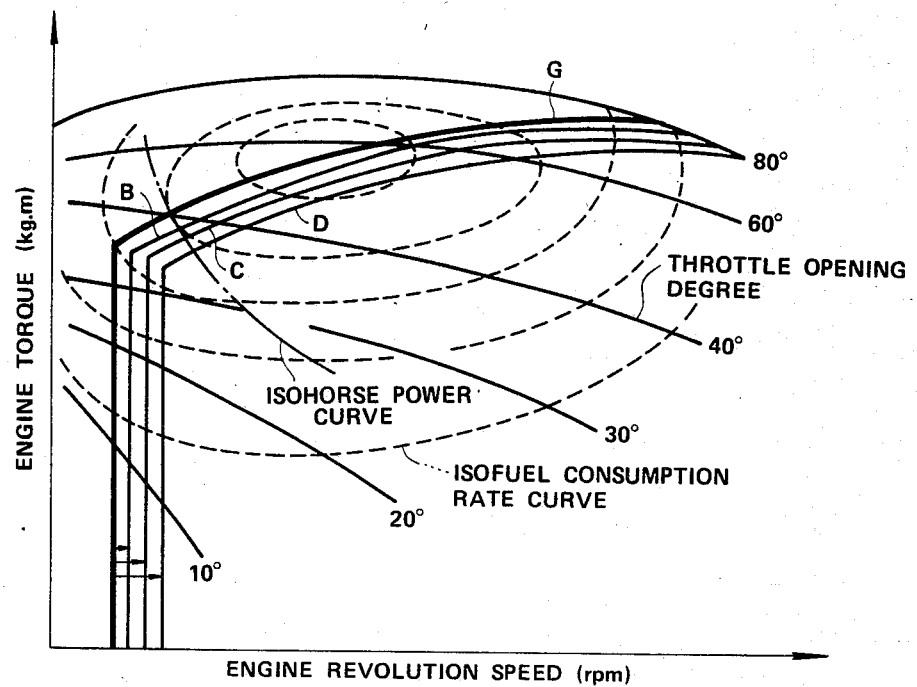
FIG. 24 is a similar view to FIG. 15 and used to illustrate the effect of the present invention.

Referring now to the engine performance map shown in FIG. 24, the result from the present invention is described. Normally, the control is effected along the minimum fuel consumption rate curve G indicated by the bold solid line, but in the case of shortage in power, the control is effected along the fine solid drawn curve B, C or D in response to the degree of the shortage. As a result, since a relatively high engine speed operating range is used, power output increases, thus ensuring a comfortable ride.

Figure 25:
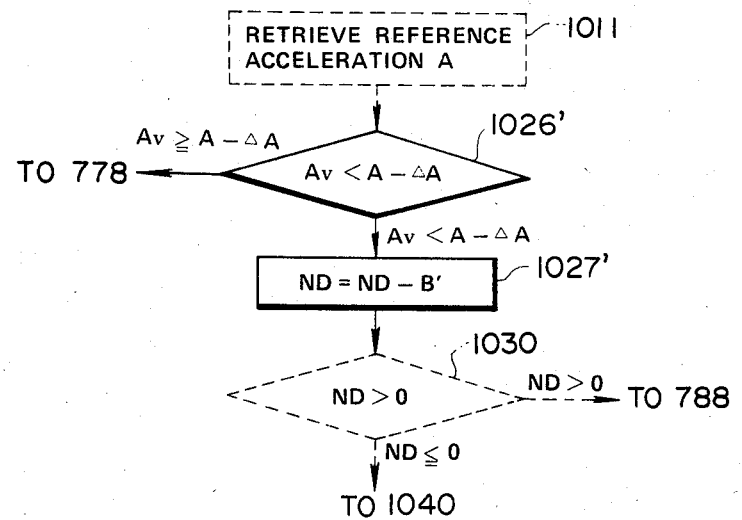
FIG. 25 is a portion of a flow chart of a stepper motor control routine of a second embodiment according to the present invention.

The second embodiment according to the present invention is hereinafter described in connection with FIG. 25. Although, in the above described embodiment, the actual acceleration Av is compared with the reference acceleration A (step 1026), and if the actual acceleration Av is less than the reference acceleration A, the correction value, in pulse number, proportional to the difference between them is subtracted from the desired pulse number ND (step 1027), these steps can be simplified. This can be done by replacing the steps 1026 and 1027 shown in FIG. 9(c) with steps 1026' and 1027' shown in FIG. 25. In this embodiment, if the actual acceleration Av becomes less than the reference acceleration A by a predetermined value, in pulse number, $\Delta A$ (i.e., $A - \Delta A$ may be regarded as a reference acceleration) (in step 1026'), the predetermined value, in pulse number, B' is subtracted from the desired pulse number ND (in step 1027'), and thus the shift pattern is corrected toward a larger reduction ratio side.

Figure 26:
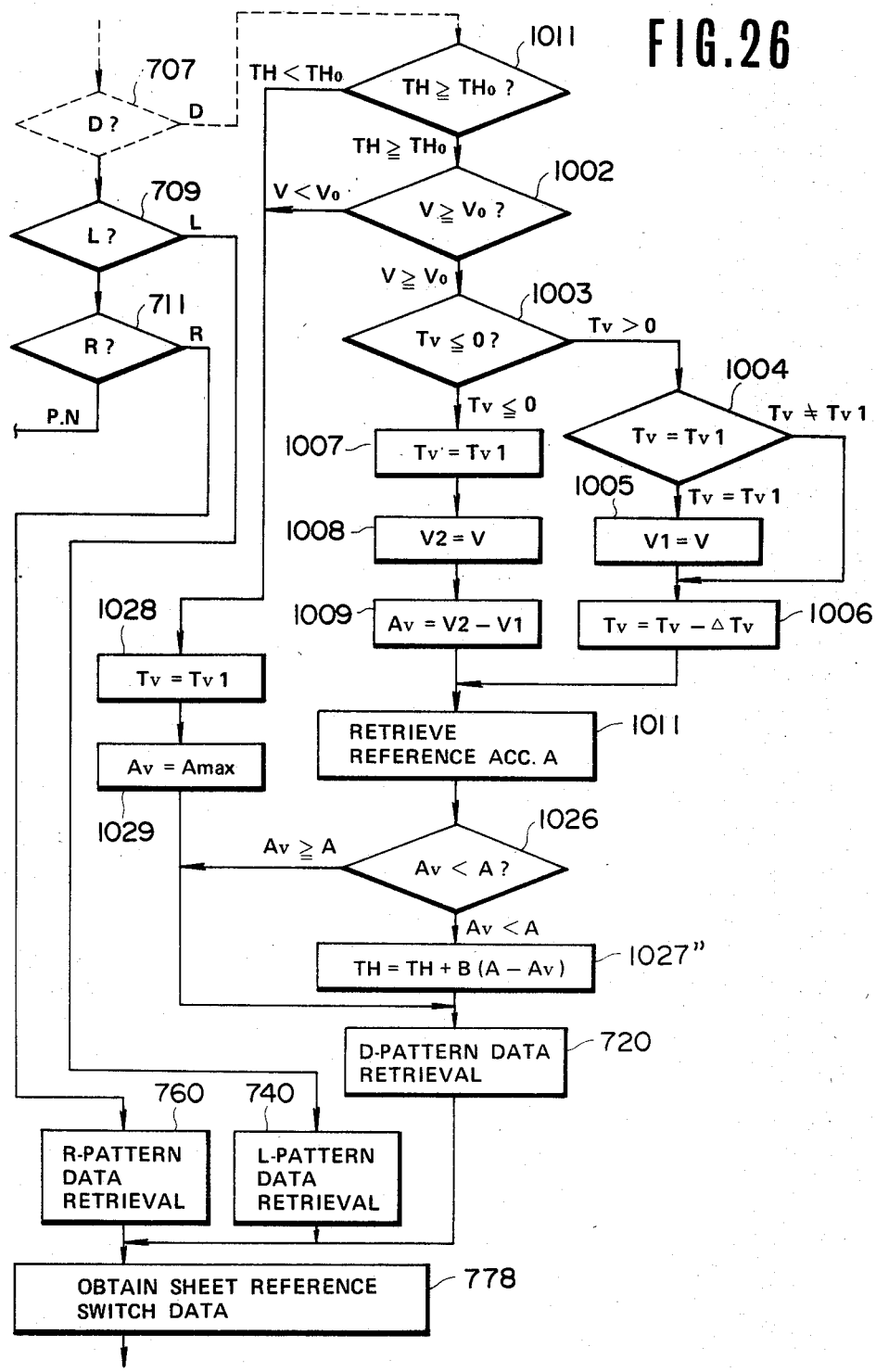
FIG. 26 is a portion of a flow chart of a stepper motor control routine of a third embodiment according to the present invention.

The third embodiment according to the present invention is described in connection with FIG. 26. This embodiment results from replacing the steps 707 to 778 shown in FIGS. 9(a) and 9(b) with steps shown in FIG. 26. Since, in FIG. 26, steps 1001 to 1026 are the same as the counterparts, i.e., steps 1001 to 1026 shown in FIG. 9(c), the description thereof is omitted. If, in step 1026, the actual acceleration Av is less than the reference acceleration A, the throttle opening degree signal TH is corrected in step 1027". In this step 1027", the actual opening degree signal TH is increased by a value proportional to a difference A−Av, a shortage in acceleration. Based on the increased or corrected throttle opening degree signal TH the D range shift pattern data retrieval in step 720 is executed to retrieve a stepper motor pulse number ND which corresponds to this increased throttle opening degree signal TH. The pulse number ND retrieved has a small value as compared to the pulse number obtained in the ordinary case, and thus the shift pattern shifted toward a larger reduction ratio side is obtained. Therefore, substantially similar operation and effect to those of the first embodiment are obtained. It follows that in this third embodiment, instead of directly correcting the pulse number ND, the throttle opening degree signal TH is corrected.

Figure 27:
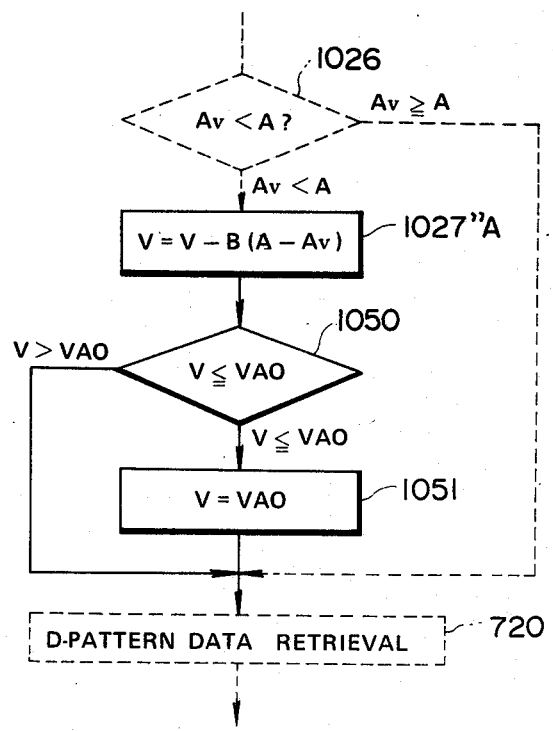
FIG. 27 is a portion of a flow chart of a setpper motor control routine of a fourth embodiment according to the present invention.

Hereinafter, the fourth embodiment according to the present invention is described in connection with FIG. 27. This embodiment results from replacing the step 1027" shown in FIG. 26 with steps 1027"A, 1050 and 1051. If, in step 1026, the actual acceleration Av is less than the reference acceleration A, the vehicle speed signal V is decreased by a value $F \cdot (A - Av)$, and the corrected vehicle speed V is compared with a reference vehicle speed VAO, i.e., a lowest vehicle speed at which the vehicle is able to travel with the largest reduction ratio in step 1050. If the corrected vehicle speed V is less than or equal to VAO, the vehicle speed V is given VAO (in step 1051) before going to step 720. If the corrected vehicle speed V is greater than VAO, the program goes directly to the D range shift pattern data retrieval in step 720 wherein desired pulse number ND is retrieved based on the corrected vehicle speed V. It follows that a pulse number ND thus obtained by this retrieval has a value corrected toward a large reduction ratio side, thus providing the similar operation and effect to those of the previously described third embodiment.

Figure 28:
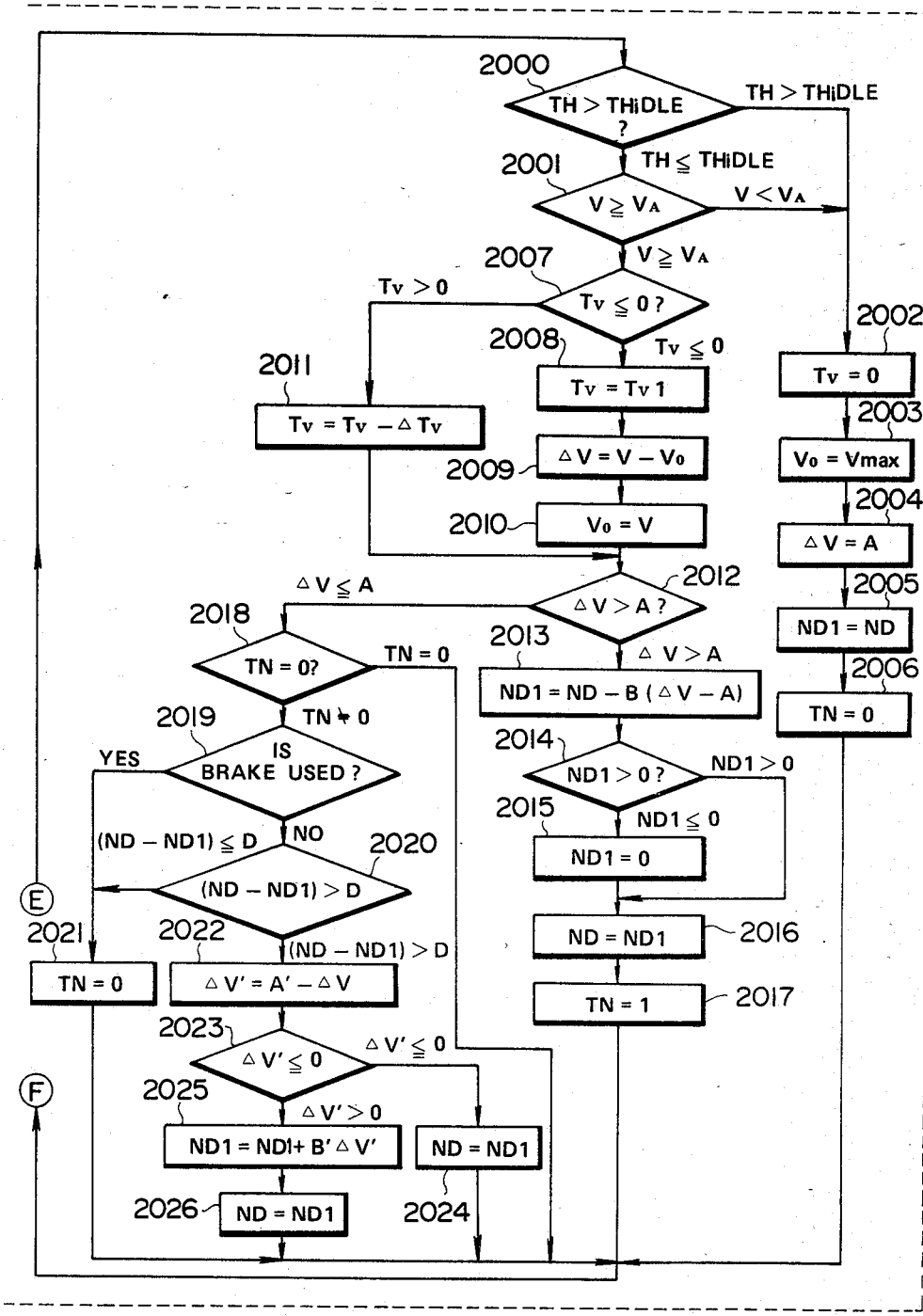
FIG. 28 is similar view to FIG. 9(c) showing a portion of a flow chart of a stepper motor control routine of a fifth embodiment according to the present invention.

Referring now to FIG. 28 together with FIGS. 9(a) and 9(b) as well, a fifth embodiment is described. This embodiment is substantially the same as the first embodiment except that instead of the steps shown in FIG. 9(c), steps 2000 to 2026 shown in FIG. 28 are executed. In these steps shown in FIG. 28, the pulse number ND obtained by executing the D range shift patttern data retrieval routine in step 720 is corrected if the vehicle is accelerated with the engine being in idle state or no load state. After the desired pulse number ND has been retrieved in step 720 shown in FIG. 9(a), the program goes to step 2000 (see FIG. 28) wherein a determination made whether the throttle opening degree signal TH indicates the idle state of the engine or no load state thereof, i.e., whether the throttle opening degree TH is greater than a predetermined low throttle opening degree value THiDLE in step 2000. If TH is greater than THiDLE, initial values are set in steps 2002 to 2006 as will be described later. If TH is less than or equal to THiDLE, a determination is made whether the vehicle speed V is greater than a predetermined low vehicle speed value VA, i.e., for example 10 km/h, in step 1001. If V is less than VA, the various initial values are set in steps 1002 to 1006. Referring to the initial values, an acceleration timer Tv is given a zero value (in step 2002), a preceding routine vehicle speed Vo is given a maximum vehicle speed Vmax (in step 2003), a vehicle speed increment (vehicle acceleration) $\Delta V$ is given a reference acceleration value A, (i.e., a certain value near zero) (in step 2004), a corrected desired pulse number ND1 is given the desired pulse number ND retrieved (in step 2005), and a correction resume indicator TN which indicates a correction history of the reduction ratio is given a zero value (in step 2006). Thereafter, the program goes to step 778 shown in FIG. 9(a). Therefore, if the throttle opening degree TH is greater than the idle position THiDLE (TH>THiDLE) or if the vehicle speed V is less than VA (V<VA), the desired pulse number ND is not corrected and the reduction ratio is controlled along the shift pattern predetermined by the D range shift pattern data.

If, in steps 2000 and 2001, the throttle opening degree TH is less than or equal to THiDLE, indicating the idle state, and the vehicle speed V is greater than or equal to VA, a determination is made in step 2007 whether the timer Tv is less than or equal to a zero value. By the time the program arrives at the step 2007, the intial values have been set in steps 2002 to 2006 because before reaching this step 2007 there usually has taken place a state wherein the vehicle speed is less than VA or a state wherein the throttle opening degree is depressed deeper than THiDLE and besides the setting of the initial values, i.e., Tv=0, Vo=Vmax, TN=0, is carried out upon start-up of the engine. It follows that in the subsequent routine to the routine where the steps 2002 to 2006 were executed, the program goes from step 2007 to a step 2008 because Tv is zero in the step 2007. In the step 2008, Tv is given a value Tv1. In the subsequent step, $\Delta V$ is obtained by subtracting the preceding routine vehicle speed Vo from the present routine vehicle speed V. Since, in the situation now under consideration, the preceding routine vehicle speed Vo is given the initial value Vmax, the vehicle acceleration $\Delta V$ turns out be a large negative value. Then, in step 2010, the preceding routine vehicle speed Vo is given the present routine vehicle speed V for the execution in the next routine. Next, a determination is made whether the acceleration $\Delta V$ is greater than the reference acceleration A, i.e., a certain positive value near zero, in step 2012. What is effected in the step 2012 is to determine whether the vehicle is under acceleration or deceleration. Since now the vehicle acceleration $\Delta V$ is the large negative value, it is determined that the vehicle acceleration is less than the reference acceleration A, and thus the program goes to step 2018 wherein a determination is made whether TN is zero. The fact that TN is equal to zero indicates that the pulse number ND was not corrected, while the fact that TN is equal to 1 indicates that the pulse number ND was corrected. In this case, since TN is equal to zero, the program goes from the step 2018 directly to the step 778 shown in FIG. 9(a). The execution of the step 778 and its subsequent steps is carried out based upon the desired pulse number ND which has not been corrected. In the next routine right after the routine mentioned above, since the timer Tv was given Tv1 in the step 2008 during the preceding routine, it is determined in step 2007 that Tv is greater than zero and the program goes to step 2011 wherein the timer Tv is decreased by a small value $\Delta$Tv. Then, the program goes to step 2012 and then to step 2018 because $\Delta V$ is the same value as that in the preceding routine and thus remains less than A. Since TN is the same as that in the preceding routine, the program goes from the step 2018 to the step 778 shown in FIG. 9(a). Thus, the desired pulse number ND is not corrected by this routine. After the execution of the steps 2007, 2011, 2012, 2018, 778 and the subsequent steps is repeated several times, the timer Tv decreases below zero jafter the elapse of a certain time period because the timer Tv is decreased by the small value $\Delta$Tv in each routine. If, in step 2007, Tv becomes less than or equal to zero, the following steps 2008, 2009 and 2010 are executed again to update the acceleration $\Delta V$. The execution of the steps 2007, 2008, 2009 and 2010 is repeated after the elapse of a predetermined time period which is determined by Tv and $\Delta$Tv and the acceleration is updated after each time after the execution of these steps.

When, the acceleration $\Delta V$ thus updated becomes greater than the reference acceleration A (in step 2012), the program goes to step 2013 wherein the desired pulse number ND is corrected. In the step 2013, a value proportional to a difference between the acceleration $\Delta V$ and the reference acceleration A, i.e., $B \cdot (\Delta V - V)$, where B: constant, is subtracted from the desired pulse number ND and the result of this subtraction is set as a corrected pulse number ND1. That is, the equation $ND1 = ND - B \cdot (\Delta V - A)$ is computed in step 2013. In the subsequent step 2014, a determination is made whether the corrected desired pulse number ND1 is greater than zero. If ND1 is greater than zero, the program goes directly to step 2016, while if ND1 is less than or equal to zero, the program goes to step 2016 after ND1 is given a zero value in step 2015. In the step 2016, the desired pulse number ND is given the corrected pulse number ND1 and then the timer TN is given 1 in step 2017 before going to the step 778 shown in FIG. 9(a). Since as described later, the reduction ratio is determined uniquely by the desired pulse number ND and the more the desired pulse number ND decreases, the more the reduction ratio increase, if the reduction ratio is controlled based on the corrected desired pulse number, the reduction ratio is obtained which is greater than that obtained during normal operating condition. Thus, the reduction ratio increases when the vehicle travels down a slope with the engine being in idle state or no load state, resulting in an increase in engine revolution speed, thus ensuring effective engine braking performance.

If, in the step 2012, the vehicle acceleration $\Delta V$ is less than or equal to the reference acceleration A, a determination is made whether TN is zero in step 2018. If TN is zero, i.e., no correction has been taken place, the program goes directly to the step 778 and the desired pulse number ND is not corrected. If the correction of the desired pulse number took place in the preceding routine (i.e., TN is not equal to zero), the program goes from the step 2018 to step 2019 wherein a determination is made whether the vehicle brake is used. The state when the brake is used is indicated by an output signal from the brake sensor 307 shown in FIG. 4. If the brake is not used, a determination is made in step 2020 whether a difference between the desired pulse number ND and the corrected desired pulse number ND1 is greater than a predetermined value D. If the difference is less than or equal to D, TN is given a zero value in step 2021 and the program goes to the step 778 shown in FIG. 9(a). If, in step 2019, the brake is used, the program goes to step 2021, too. If, in step 2020, the difference between the desired pulse number ND and the corrected desired pulse number ND1 is greater than D, a difference $\Delta V'$ is obtained between the acceleration $\Delta V$ and a predetermined acceleration value A' which is slightly smaller than the reference acceleration A in step 2022. Then, a determination is made whether this difference $\Delta V'$ is zero in step 2023. If $\Delta V'$ is less than or equal to zero, i.e., if $\Delta V$ is a substantially constant positive or negative value which is greater than or equal to A' and is less than or equal to A ($A' \leq \Delta V \leq A$), the desired pulse number ND is given the corrected pulse number ND1 in step 2024, and then the program goes to the step 778 shown in FIG. 9(a). On the other hand, if $\Delta V'$ is greater than zero, i.e., the acceleration $\Delta V$ is a large negative value and the deceleration is great, the corrected pulse number ND1 is increased by a value resulting from multiplying $\Delta V'$ with a constant B' in step 2025. In other words, the corrected pulse number ND1 is recorrected. The recorrected desired pulse number ND1 is set as the desired pulse number ND in step 2026, and then the program goes to the step 778 shown in FIG. 9(a). The recorrection of the corrected pulse number ND1 is effected in order to soften the engine braking effect by increasing the stepper pulse number to decrease the reduction ratio (see FIG. 18). With the steps 2020, 2021, 2022, 2023, 2024, 2025, and 2026, there is prevented the occurrence of a shift shock which would occur when the vehicle acceleration ΔV changes rapidly from a value greater than A down to a value less than A. What is intended here is to provide a gradual change in reduction ratio toward a value represented by the corrected pulse number by recorrecting the corrected pulse number in the reverse direction if the correction value of the corrected pulse number is considerably great. If the brake is used or the correction of the vehicle acceleration is little, the program proceeds from the step 2019 to the step 2021 or from the step 2020 to the step 2021, thus leaving the corrected desired pulse number ND1 as it is. This is because in this case there is no possibility of occurrence of shift shock.

Although, in the correction in steps 2013 and 2025, the correction value by which the desired pulse number is corrected is proportional to the difference in vehicle acceleration (ΔV−A) or (A′−ΔV), respectively, a constant correction value may be used. For example, the compution in step 2013 may be replaced with ND1=ND−C and that at the step 2025 with ND1=ND1+C′ (where C, C′: constant).

Figure 29:
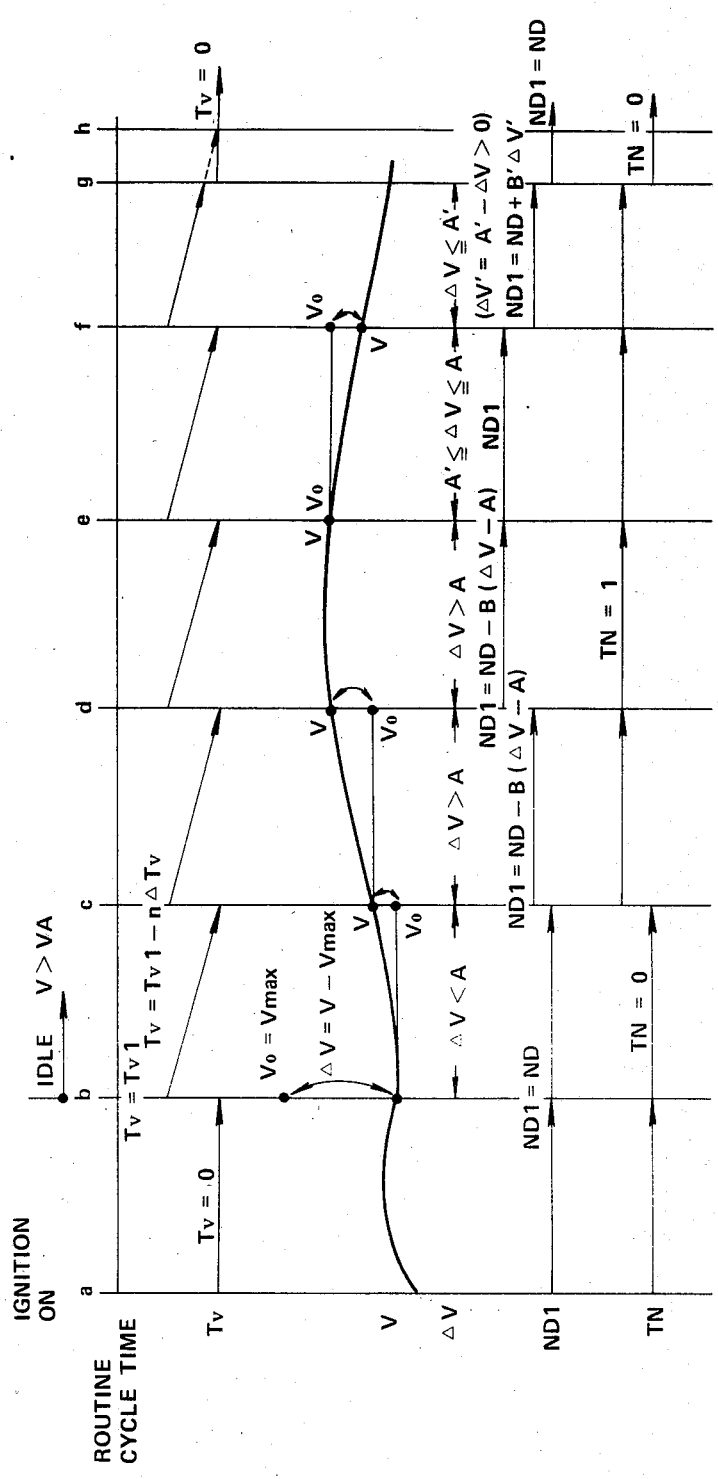
FIG. 29 is a timing chart of various signals.

Referring to FIG. 29, the operation of the fifth embodiment characterized by the steps 2000 to 2026 shown in FIG. 28 is described.

When the automotive vehicle is under little acceleration with the engine being not in idle state, the reduction ratio is controlled along the normal shift pattern (see, cylces from a to c in FIG. 29). If the vehicle is under acceleration with the engine being in the idle state, the desired pulse number is corrected toward a large reduction ratio side or increased (see cycles from c to e in FIG. 29). As a result, the effective engine braking is ensured. The same reduction ratio is maintained if the vehicle continues to travel down a slope at substantially the same vehicle speed. If, the engine braking is excessively great for travelling down a slope of small gradient, the recorrection of the corrected pulse number ND1 toward a small reduction ratio side is initiated when the vehicle begins to decelerate (see cycles e to g in FIG. 29). After the reduction ratio returns to the reduction ratio determined by the normal shift pattern as a result of the recorrection, the reduction ratio is controlled subsequently along the normal shift pattern. Thus, if the engine braking effect is excessively great, the reduction ratio is automatically decreased to decrease the engine braking effect. As a result, the same travelling speed of the vehicle can be maintained irrespective of the variation in gradient of a slope. The above mentioend recorrection control is released when the throttle opening degree is increased (see cycle after g in FIG. 29). Thus, if the accelerator pedal is depressed during travelling down a slope, the vehicle will be accelerated at the will of the driver. When the brake is depressed, the correction control designed to decrease the engine braking effect is released. If the brake is released after the vehicle speed has been decreased to a desired value, the above mentioned control resumes and the vehicle speed at the instance when the brake is released is subsequently maintained.

A sixth embodiment is hereinafter described in connection with FIG. 30 and FIGS. 9(a), 9(b) and 28 as well.

Figure 30:
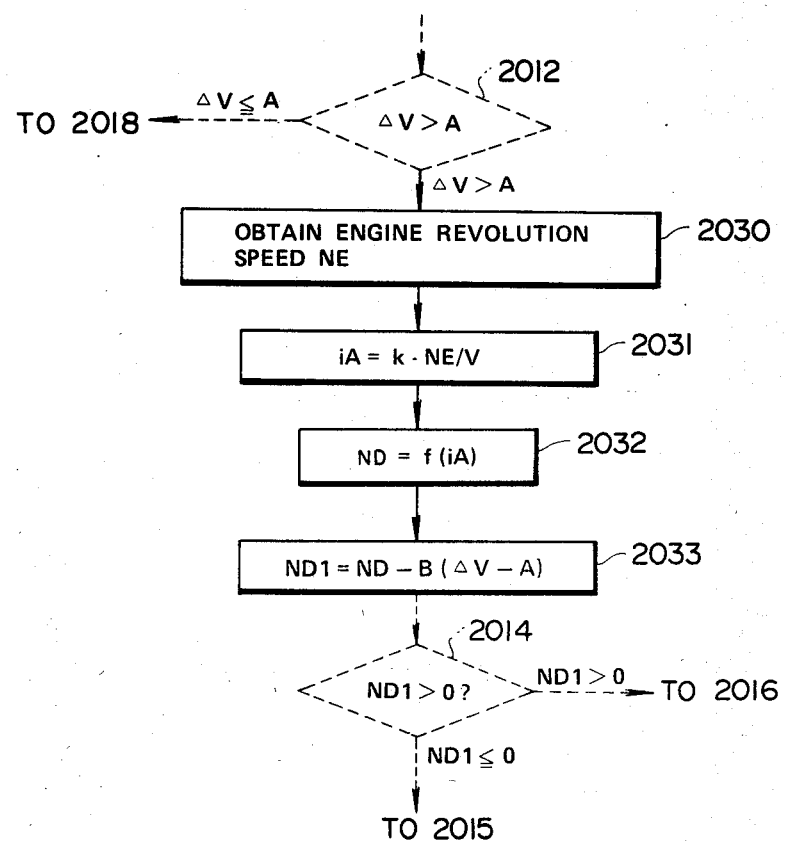
FIG. 30 is a portion of a flow chart of a stepper motor control routine of a sixth embodiment according to the present invention.

This sixth embodiment results from replacing the step 2013 of the fifth embodiment shown in FIG. 28 with steps 2030 to 2033 shown in FIG. 30.

If, in step 2012, ΔV is greater than A, an engine revolution speed NE is obtained in step 2030 from engine revolution speed sensor 301 (see FIG. 4), and in step 2031, the equation iA=k·NE/V (where k: constant) is computed to obtain an actual reduction ratio iA. In the next step 2032, a pulse number ND which corresponds to the actual reduction ratio iA is retrieved using the relation shown in the graph in FIG. 18. Then, in step 2033, a corrected desired pulse number ND1 is obtained by subtracting from the pulse number ND a correction value B·(ΔV−A), where: B is constant. The subsequent steps are the same as the counterparts of the fifth embodiment. In summary, in this embodiment, the actual pulse number NA is corrected and used as a base in effecting the correction, while in the fifth embodiment, the desired pulse number ND is used as a base in effecting the correction. Apparently, the sixth embodiment provides substantially similar effect and operation to those of the fifth embodiment.

A seventh embodiment is described in connection with FIG. 31 and FIGS. 9(a), 9(b) and 28 as well.

Figure 31:
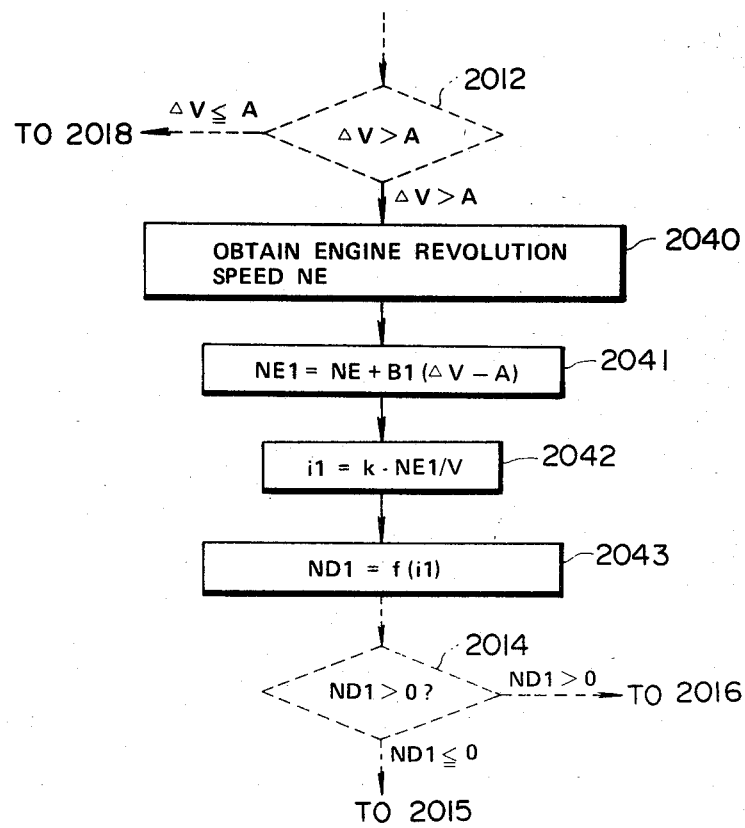
FIG. 31 is a portion of a flow chart of a stepper motor control routine of a seventh embodiment according to the present invention.

This seventh embodiment results from replacing the step 2013 (see FIG. 28) of the fifth embodiment with steps 2040 to 2043 shown in FIG. 31.

If, in step 2012, ΔV is greater than A, the engine revolution speed NE is obtained in step 2040, then a corrected engine revolution speed NE1 is obtained by adding to the engine revolution speed NE a correction value B1·(ΔV−A), where B is constant (i.e., the engine revolution speed is corrected or increased). In the next step 2042, a corrected reduction ratio i1=k·NE1/V (where k: constant) is computed. Subsequently, in step 2043, a corrected desired pulse number ND1 which corresponds to the corrected reduction ratio i1 is obtained using the relation shown the graph in FIG. 18. The subsequent steps are the same as the counterparts of the fifth embodiment. In summary, in this seventh embodiment, the engine revolution speed NE is corrected and the desired pulse number is corrected in accordance with the corrected engine reolution speed NE1. Apparently, the seventh embodiment provides substantially similar effect and operation to those of the fifth embodiment.

An eighth embodiment is described in connection with FIG. 32 and FIGS. 9(a), and FIG. 28 as well.

This eighth embodiment results from replaing the stop 2013 (see FIG. 28) of the fifth embodiment with steps 2050 to 2053 shown in FIG. 31.

If, in step 2012, ΔV is greater than A, the engine revolution speed NE is obtained in step 2050, then a corrected vehicle speed V1 is obtained by subtracting from the vehicle speed V a correction value B2·(ΔV−A), where B is constant in step 2051 (i.e., the vehicle speed is corrected or decreased. In the next step 2052, a corrected reduction ratio is i2=k·NE/V1 (where k: constant) is computed. Subsequently, in step 1053, a corrected pulse number ND1 which corresponds uniquely to the corrected reduction ratio 12 is obtained using the relation shown by the graph in FIG. 18. The subsequent steps are the same as the counterparts of the fifth embodiment. In summary, in the eighth embodiment, the vehicle speed V is corrected and the desired pulse number is corrected in accordance with the corrected vehicle speed V1. Obviously, this embodiment provides substantially similar effect and operation to those obtained in the fifth embodiment.

Although, in the above mentioned sixth, seventh and eighth embodiments, the correction value is B·(ΔV−A), B1·(ΔV−A) or B2·(ΔV−A) and thus is proportional to the difference in acceleration, but the constant correction value may be used.

What is claimed is:

1. A method for controlling a motor vehicle having an internal combustion engine and a continuously variable transmission operatively coupled with the engine, said method comprising the steps of:
   detecting vehicle speed of the motor vehicle at predetermined intervals of time and generating a vehicle speed indicative signal indicative of the vehicle speed detected;
   determining an actual acceleration based on said vehicle speed indicative signal and generating an actual acceleration indicative signal indicative of the actual acceleration determined;
   determining a reference acceleration and generating a reference acceleration indicative signal indicative of the reference acceleration determined;
   comparing said actual acceleration indicative signal with said reference acceleration indicative signal and generating a comparison result indicative signal when said actual acceleration indicative signal attains a predetermined relationship with said reference acceleration indicative signal; and
   controlling the reduction ratio of the continuously variable transmission after said comparison result indicative signal has been generated after a predetermined condition has been met in such a manner that said actual acceleration indicative signal is adjusted to said reference acceleration indicative signal.

2. A method for controlling a motor vehicle having an internal combustion engine and a continuously variable transmission operatively coupled with the engine, said method comprising the steps of:
   detecting vehicle speed of the motor vehicle at predetermined intervals of time and generating a vehicle speed indicative signal indicative of the vehicle speed detected;
   determining an actual acceleration based on said vehicle speed indicative signal and generating an actual acceleration indicative signal indicative of the actual acceleration determined;
   determining a reference acceleration and generating a reference acceleration indicative signal indicative of the reference acceleration determined;
   comparing said actual acceleration indicative signal with said reference acceleration indicative signal and generating a comparison result indicative signal when said actual acceleration indicative signal attains a predetermined relationship with said reference acceleration indicative signal;
   executing a first routine which includes a step of determining, responsive at least to said vehicle speed indicative signal, a first desired reduction ratio and a step of adjusting an actual reduction ratio of the continuously variable transmission toward said first derived reduction ratio;
   switching from said first routine executing step after said comparison result indicative signal has been generated after a predetermined condition has been met to executing a second routine which includes a step of determining, at least responsive to said vehicle speed indicative signal, a second desired reduction ratio and a step of adjusting the actual reduction ratio of the continuously variable transmission toward said second desired reduction ratio; and
   repeating said vehicle speed detecting step, said actual acceleration determining step, said reference acceleration determining step, said comparing step and said second routine executing step as long as said comparison result indicative signal is generated and said predetermined condition is met until said actual acceleration indicative signal fails to attain said predetermined relationship with said reference acceleration indicative signal.

3. A method as claimed in claim 2, wherein said predetermined condition is met when load applied to the internal combustion engine is greater than a predetermined level and said vehicle speed indicative signal is greater than a predetermined value, and said predetermined relationship is attained when said actual acceleration indicative signal is less than said reference acceleration indicative signal.

4. A method as claimed in claim 2, wherein said predetermined condition is met when load applied to the internal combustion engine is less than a predetermined level and said vehicle speed indicative signal is greater than a predetermined value, and said predetermined relationship is attained when said actual acceleration indicative signal is greater than said reference acceleration indicative signal.

5. A method for controlling a motor vehicle having an internal combustion engine and a continuously variable transmission operatively coupled with the engine, said method comprising the steps of:
   detecting vehicle speed of the motor vehicle at predetermined intervals of time and generating a vehicle speed indicative signal indicative of the vehicle speed detected;
   determining an actual acceleration based on said vehicle speed indicative signal and generating an actual acceleration indicative signal indicative of the actual acceleration determined;
   determining a reference acceleration and generating a reference acceleration indicative signal indicative of the reference acceleration determined;
   comparing said actual acceleration indicative signal with said reference acceleration indicative signal and generating a comparison result indicative signal when said actual acceleration indicative signal attains a predetermined relationship with said reference acceleration indicative signal;
   determining, responsive at least to said vehicle speed indicative signal, a first desired reduction ratio;
   executing a first routine which includes a step of adjusting an actual reduction ratio of the continuously variable transmission toward said first desired reduction ratio;
   switching from said first routine executing step after said comparison result indicative signal has been generated after a predetermined condition has been met to executing a second routine which includes a step of correcting said first desired reduction ratio to give a second desired reduction ratio and a step of adjusting the actual reduction ratio of the continuously variable transmission toward said second desired reduction ratio; and repeating said vehicle speed detecting step, said actual acceleration determining step, said reference acceleration determining step, said comparing step and said second routine executing step as long as said comparison result indicative signal is generated and said predetermined condition is met until said actual acceleration indicative signal fails to attain said predetermined relationship with said reference acceleration indicative signal.

6. A method as claimed in claim 5, wherein said predetermined condition is met when load applied to the internal combustion engine is greater than a predetermined level and said vehicle speed indicative signal is greater than a predetermined value, and said predetermined relationship is attained when said actual acceleration indicative signal is less than said reference acceleration indicative signal.

7. A method as claimed in claim 6, wherein said correcting step includes a step of varying said first desired reduction ratio by a value proportional to a difference of said actual acceleration from said reference acceleration.

8. A method as claimed in claim 6, wherein said correcting step includes a step of varying said first desired reduction ratio by a predetermined amount.

9. A method as claimed in claim 5, wherein said predetermined condition is met when load applied to the internal combustion engine is less than a predetermined level and said vehicle speed indicative signal is greater than a predetermined value, and said predetermined relationship is attained when said actual acceleration indicative signal is greater than said reference acceleration indicative signal.

10. A method as claimed in claim 9, wherein said correcting step includes a step of varying said first desired reduction ratio by a value proportional to a difference of said actual acceleration from said reference acceleration.

11. A method for controlling a motor vehicle having an internal combustion engine and a continuously variable transmission operatively coupled with the engine, the internal combustion engine having a member that is operable in degrees to control load applied to the internal combustion engine, said method comprising the steps of:
  detecting the degree in which the member is operated and generating a load indicative signal indicative of the degree detected;
  detecting vehicle speed of the motor vehicle at predetermined intervals of time and generating a vehicle speed indicative signal indicative of the vehicle speed detected;
  determining an actual acceleration based on said vehicle speed indicative signal and generating an actual acceleration indicative signal indicative of the actual acceleration determined;
  preparing data regarding acceleration values, said data corresponding to combinations of a degree in which the member is operated and a vehicle speed;
  retrieving said data using said load indicative signal and said vehicle speed indicative signal to give, as a reference acceleration, an acceleration value for said load indicative signal and said vehicle speed indicative signal and generating a reference acceleration indicative signal indicative of the reference acceleration given;
  comparing said actual acceleration indicative signal with said reference acceleration indicative signal and generating a comparison result indicative signal when said actual acceleration indicative signal is less than said reference acceleration indicative signal;
  determining, responsive to said load indicative signal and vehicle speed indicative signal, a first desired reduction ratio and generating a first desired reduction ratio indicative signal;
  executing a first routine which includes a step of adjusting an actual reduction ratio of the continuously variable transmission toward said first desired reduction ratio;
  switching from said first routine executing step after said comparison result indicative signal has been generated after a predetermined condition has been met to executing a second routine which includes a step of correcting said first desired reduction ratio indicative signal to give a second desired reduction ratio indicative signal and a step of adjusting the actual reduction ratio of the continuously variable transmission toward a reduction ratio by said second desired reduction ratio indicative signal; and
  repeating said degree detecting step, said vehicle speed detecting step, said actual acceleration determining step, said reference acceleration determining step, said comparing step, said first desired reduction ratio determining step, said second routine executing step as long as said comparison result indicative signal is generated and said predetermined condition is met until said actual acceleration indicative signal fails to be less than said reference acceleration indicative signal.

12. A method as claimed in claim 11, wherein said predetermined condition is met when load applied to the internal combustion engine is greater than a predetermined level and said vehicle speed indicative signal is greater than a predetermined value, and said predetermined relationship is attained when said actual acceleration indicative signal is less than said reference acceleration indicative signal.

13. A method as claimed in claim 12, wherein said first desired reduction ratio indicative signal determining step includes the steps of:
  preparing data regarding reduction ratio values, said data corresponding to combinations of a degree in which the member is operated and a vehicle speed; and
  retrieving said data regarding reduction ratio values using said load indicative signal and said vehicle speed indicative signal to give, as said first desired reduction ratio, a reduction ratio value for said load indicative signal and said vehicle speed indicative signal.

14. A method for controlling a motor vehicle having an internal combustion engine and a continuously variable transmission operatively coupled with the engine, the internal combustion engine having a member that is operable in degrees to control load applied to the internal combustion engine, said method comprising the steps of:
  detecting degree in which the member is operated and generating a load indicative signal indicative of the degree detected;
  detecting vehicle speed of the motor vehicle at predetermined intervals of time and generating a vehicle speed indicative signal indicative of the vehicle speed detected;

determining an actual acceleration based on said vehicle speed indicative signal and generating an actual acceleration indicative signal indicative of the actual acceleration determined;

preparing data regarding acceleration values, said acceleration data corresponding to combinations of a degree in which the member is operated and a vehicle speed;

retrieving said data using said load indicative signal and said vehicle speed indicative signal to give, as a reference acceleration, an acceleration value for said load indicative signal and said vehicle speed indicative signal and generating a reference acceleration indicative signal indicative of the reference acceleration given;

comparing said actual acceleration indicative signal with said reference acceleration indicative signal and generating a comparison result indicative signal indicative of an event that said actual acceleration indicative signal is less than said reference acceleration indicative signal;

executing a first routine which includes a step of determining responsive to said load indicative signal and vehicle speed indicative signal a first desired reduction ratio and generating a first desired reduction ratio indicative signal and a step of adjusting an actual reduction ratio of the continuously variable transmission toward said first desired reduction ratio;

switching from said first routine executing step after said comparison result indicative signal has been generated after a predetermined condition has been met to executing a second routine which includes a step of correcting one of said load indicative signal and said vehicle speed indicative signal to give a corrected signal, a step of determining responsive to said corrected signal and the other one of said load indicative signal and said vehicle speed indicative signal which has not been subject to the correction to give a second desired reduction ratio and generating a second desired reduction ratio indicative signal indicative of said second desired reduction ratio, and a step of adjusting the actual reduction ratio of the continuously variable transmission toward a reduction ratio indicated by said second desired reduction ratio indicative signal; and repeating said degree detecting step, said vehicle speed detecting step, said actual acceleration determining step, said reference acceleration determining step, said comparing step, and said second routine executing step as long as said comparison result indicative signal is generated and said predetermined condition is met until said actual acceleration indicative signal fails to be less than said reference acceleration indicative signal.

15. A method as claimed in claim 14, wherein said predetermined condition is met when load applied to the internal combustion engine is greater than a predetermined level and said vehicle speed indicative signal is greater than a predetermined value, and said predetermined relationship is attained when said actual acceleration indicative signal is less than said reference acceleration indicative signal.

16. A method as claimed in claim 15, wherein said correcting step includes a step of varying said one of said load indicative signal and said vehicle speed indicative signal by an amount proportional to a difference of said actual acceleration indicative signal from said reference acceleration indicative signal.

17. A method for controlling a motor vehicle having an internal combustion engine and a continuously variable transmission operatively coupled with the engine, the internal combustion engine having a throttle that opens in degrees to control load applied to the internal combustion engine, said method comprising the steps of:

detecting degree in which the throttle is opened and generating a load indicative signal indicative of the degree detected;

detecting vehicle speed of the motor vehicle at predetermined intervals of time and generating a vehicle speed indicative signal indicative of the vehicle speed detected;

determining an actual acceleration based on said vehicle speed indicative signal and generating an actual acceleration indicative signal indicative of the actual acceleration calculated;

determining a reference acceleration and generating a reference acceleration indicative signal indicative of the reference acceleration determined;

comparing said actual acceleration indicative signal with said reference acceleration indicative signal and generating a comparison result indicative signal when said actual acceleration indicative signal is greater than said reference acceleration indicative signal;

determining, responsive to said load indicative signal and vehicle speed indicative signal, a first desired reduction ratio and generating a first desired reduction ratio indicative signal;

executing a first routine which includes a step of adjusting an actual reduction ratio of the continuously variable transmission toward said first desired reduction ratio;

switching from said first routine executing step after said comparison result indicative signal has been generated after a predetermined condition has been met to executing a second routine which includes a step of correcting said first desired reduction ratio indicative signal to give a second desired reduction ratio indicative signal and a step of adjusting the actual reduction ratio of the continuously variable transmission toward a reduction ratio indicated by said second desired reduction ratio indicative signal; and repeating said degree detecting step, said vehicle speed detecting step, said actual acceleration determining step, said reference acceleration determining step, said comparing step, said first desired reduction ratio determining step, and said second routine executing step as long as said comparison result indicative signal is generated and said predetermined condition is met until said actual acceleration indicative signal fails to be greater than said reference acceleration indicative signal.

18. A method for controlling a motor vehicle having an internal combustion engine and a continuously variable transmission operatively coupled with the engine, the internal combustion engine having a member that is operable in degrees to control load applied to the internal combustion engine, said method comprising the steps of:

detecting degree in which the member is operated and generating a load indicative signal indicative of the degree detected;

detecting vehicle speed of the motor vehicle at predetermined intervals of time and generating a vehicle speed indicative signal indicative of the vehicle speed detected;

determining an actual acceleration based on said vehicle speed indicative signal and generating an actual acceleration indicative signal indicative of the actual acceleration calculated;

determining a reference acceleration and generating a reference acceleration indicative signal indicative of the reference acceleration determined;

comparing said actual acceleration indicative signal with said reference acceleration indicative signal and generating a comparison result indicative signal when said actual acceleration indicative signal is greater than said reference acceleration indicative signal;

executing a first routine which includes a step of determining responsive to said load indicative signal and vehicle speed indicative signal a first desired reduction ratio and generating a first desired reduction ratio indicative signal, a step of adjusting an actual reduction ratio of the continuously variable transmission toward said first desired reduction ratio;

switching from said first routine executing step after said comparison result indicative signal has been generated after a predetermined condition has been met to executing a second routine which includes a step of detecting an engine revolution speed of the internal combustion engine and generating an engine revolution speed indicative signal indicative of the engine revolution speed detected, a step of determining a second desired reduction ratio indicative signal using said engine revolution speed indicative signal and said vehicle speed indicative signal, and a step of adjusting the actual reduction ratio of the continuously variable transmission toward a reduction ratio indicated by said second desired reduction ratio indicative signal; and repeating said degree detecting step, said vehicle speed detecting step, said actual acceleration determining step, said reference acceleration determining step, said comparing step, and said second routine executing step as long as said comparison result indicative signal is generated and said predetermined condition is met until said actual acceleration indicative signal fails to be greater than said reference acceleration indicative signal.

19. A method as claimed in claim 18, wherein said predetermined condition is met when load applied to the internal combustion engine is less than a predetermined level and said vehicle speed indicative signal is greater than a predetermined value, and said predetermined relationship is attained when said actual acceleration indicative signal is greater than said reference acceleration indicative signal.

20. A method as claimed in claim 19, wherein said second desired reduction ratio determining step includes the steps of:

calculating a predetermined equation using said engine revolution speed indicative signal and said vehicle speed indicative signal to give a result; and varying said result by a value proportional to a difference of said actual acceleration indicative signal from said reference acceleration indicative signal to give said second desired reduction ratio indicative signal.

21. A method as claimed in claim 19, wherein said second desired reduction ratio determining step includes the steps of:

varying said engine revolution speed indicative signal by a value proportional to a difference of said actual acceleration indicative signal from said reference acceleration indicative signal to give a corrected engine revolution indicative signal; and calculating a predetermined equation using said corrected engine revolution speed indicative signal and said vehicle speed indicative signal to give said second desired reduction ratio indicative signal.

22. A method as claimed in claim 19, wherein said second desired reduction ratio determining step includes the steps of:

varying said vehicle speed indicative signal by a value proportional to a difference of said actual acceleration indicative signal from said reference acceleration indicative signal to give a corrected vehicle speed indicative signal; and calculating a predetermined equation using said engine revolution speed indicative signal and said corrected vehicle speed indicative signal to give said second desired reduction ratio indicative signal.

* * * * *